Aug. 21, 1951        R. C. KNOWLES ET AL         2,564,698
                      AIRCRAFT COMPUTER
Filed July 21, 1943                          5 Sheets-Sheet 1
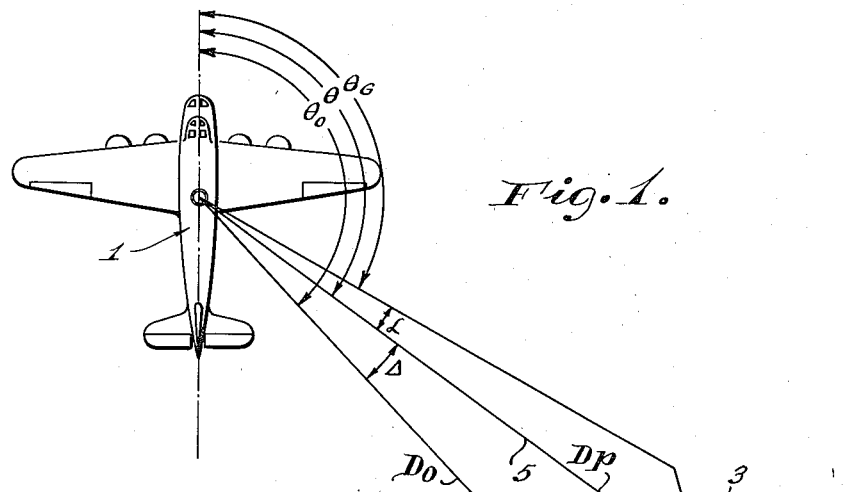
Fig. 1.
Fig. 2.
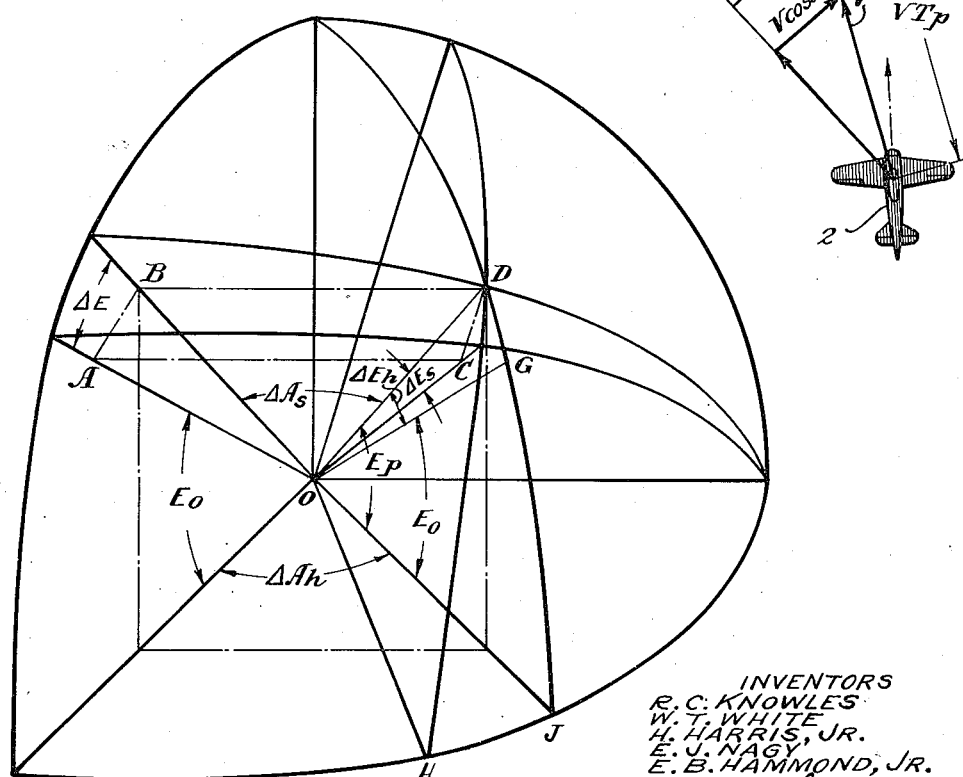
INVENTORS
R. C. KNOWLES
W. T. WHITE
H. HARRIS, JR.
E. J. NAGY
E. B. HAMMOND, JR.
BY Herbert H. Thompson
      ATTORNEY.

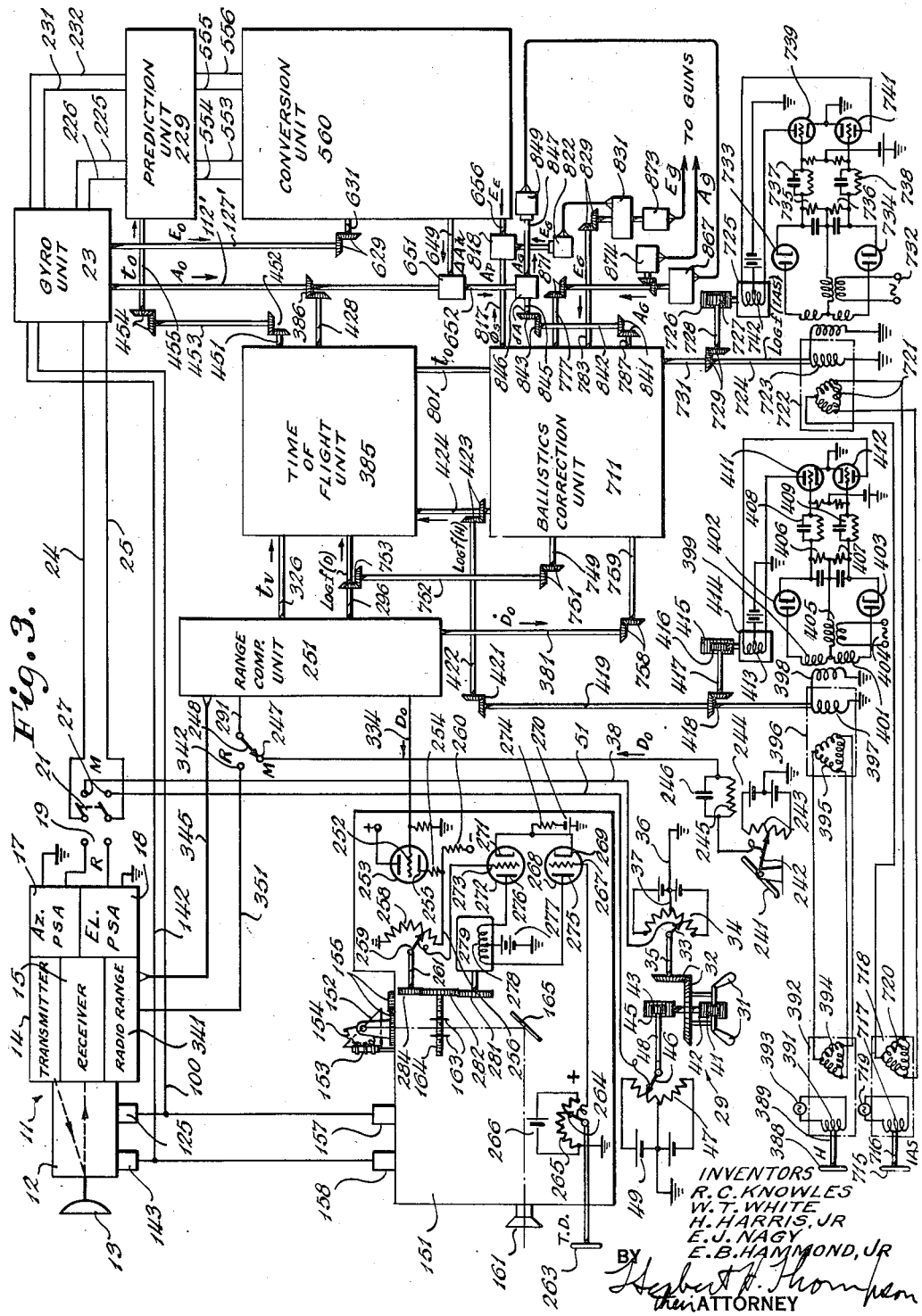

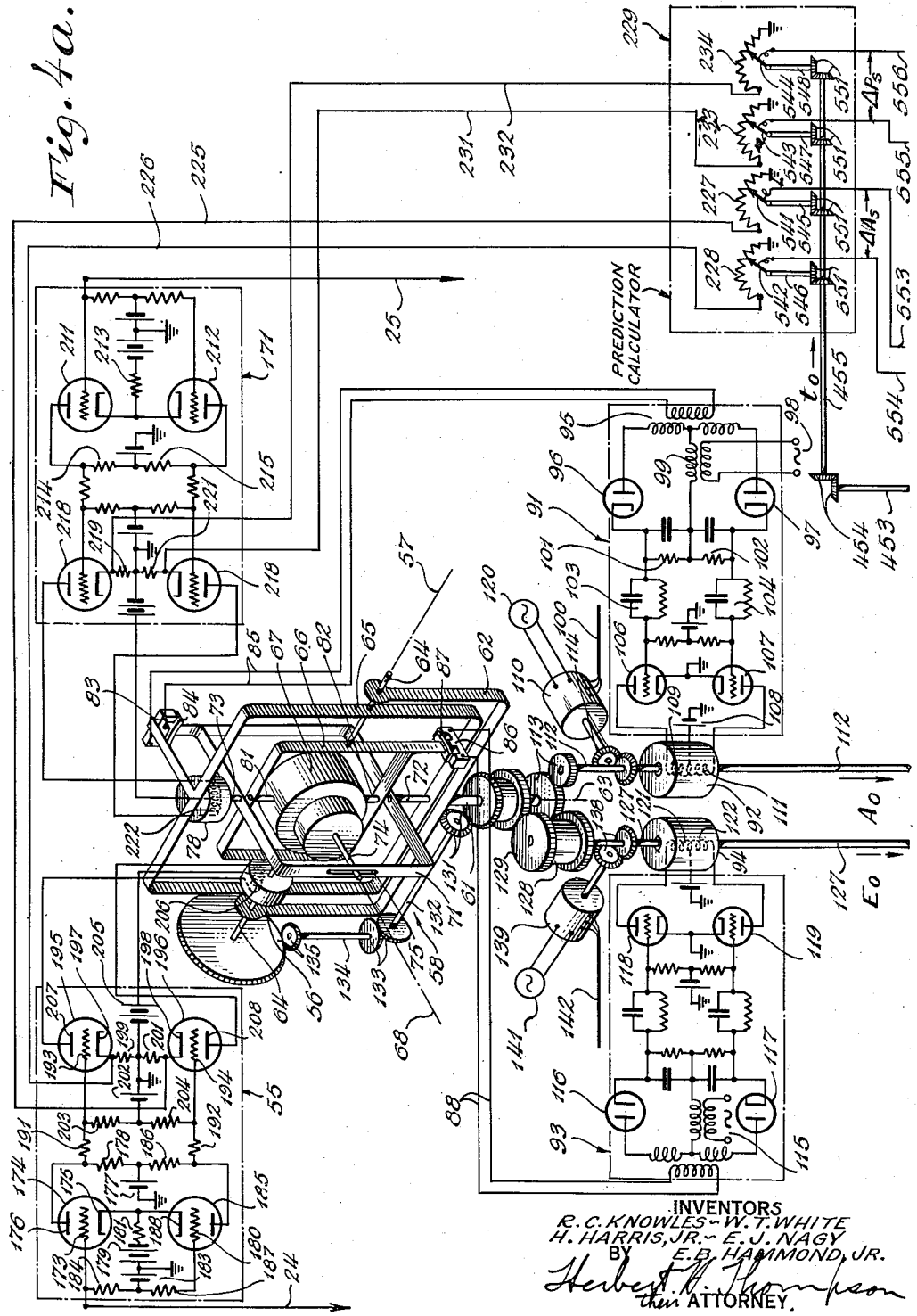

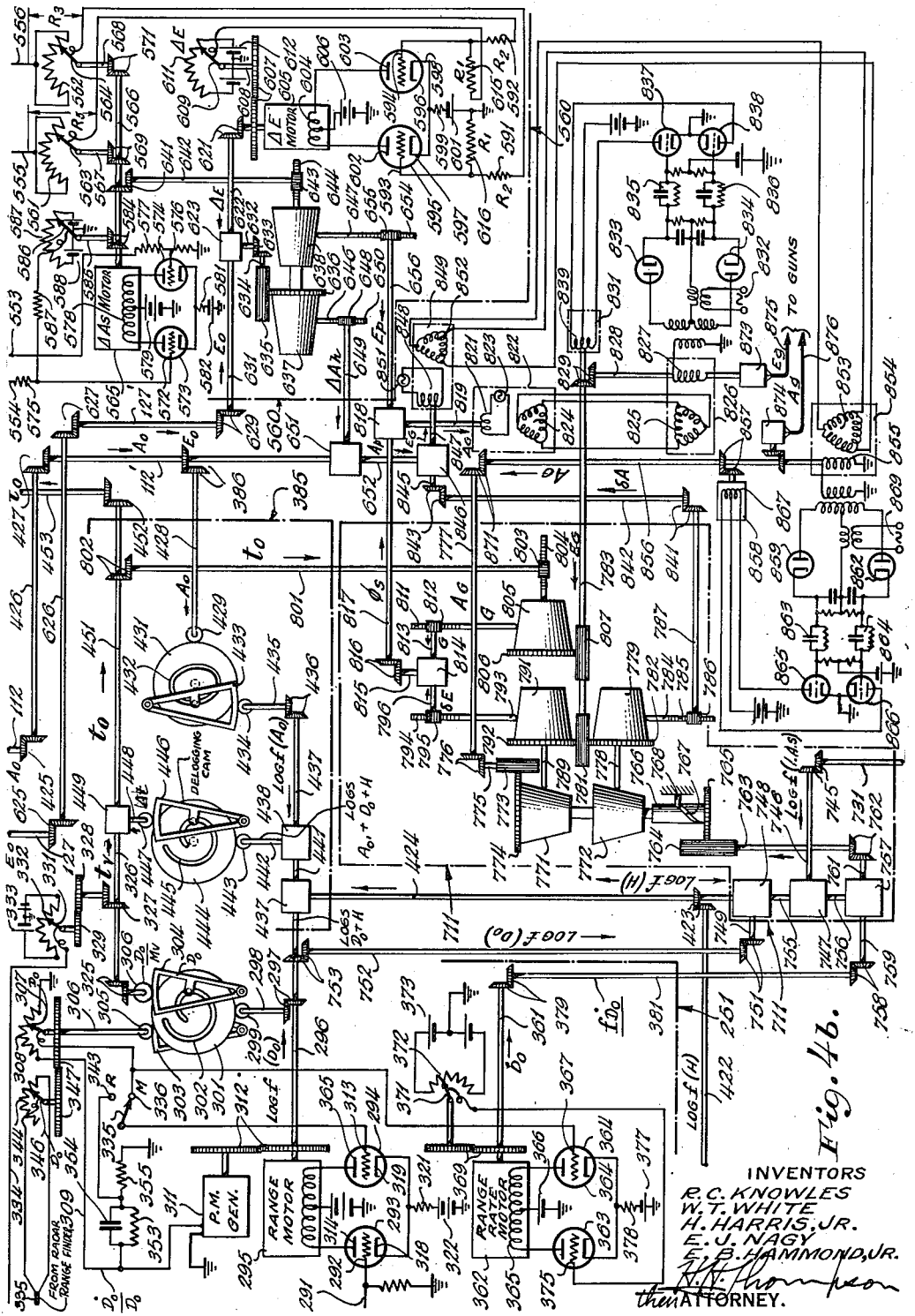

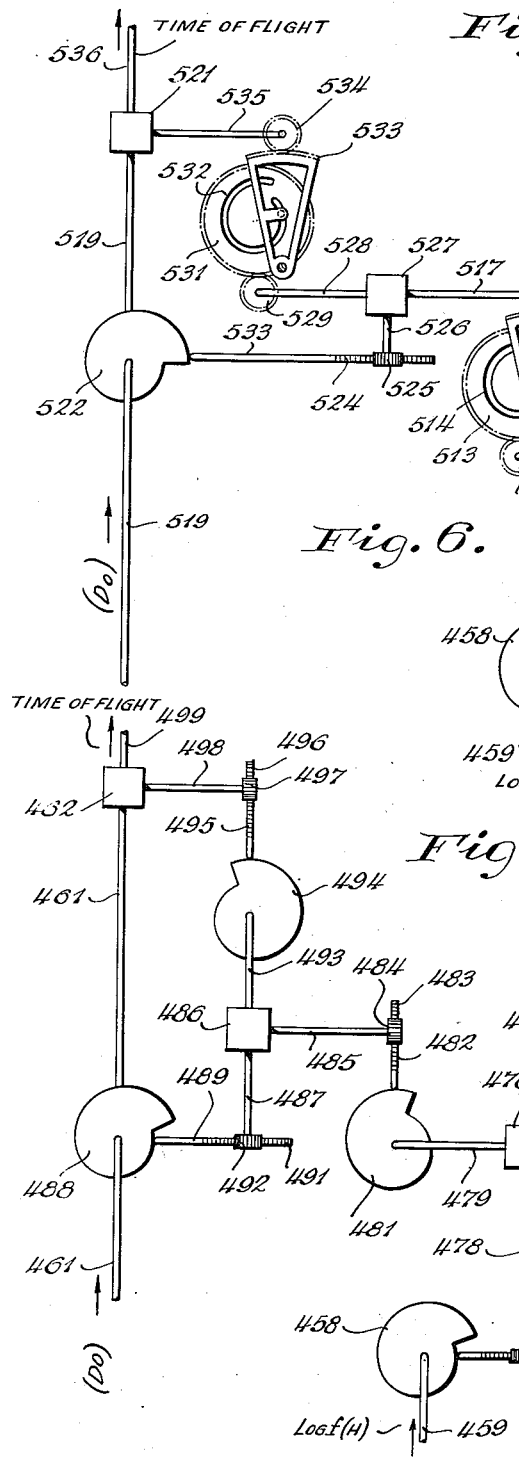

Patented Aug. 21, 1951

2,564,698

UNITED STATES PATENT OFFICE 2,564,698

AIRCRAFT COMPUTER

Richard C. Knowles, New York, Walter T. White, Hempstead, Herbert Harris, Jr., Cedarhurst, Edward J. Nagy, Garden City, and Edmund B. Hammond, Jr., Brooklyn, N. Y., assignors to The Sperry Corporation, a corporation of Delaware Application July 21, 1943, Serial No. 495,556

2 Claims. (Cl. 235—61.5)

This invention relates generally to fire control systems for use on aircraft, and particularly concerns improvements in computers for aiming guns carried by the craft at targets either in the form of attacking aircraft or targets located on the ground.

The production of larger aircraft has made it possible to mount correspondingly larger guns thereon and thus increase the effective range of guns carried by the aircraft. More accurate fire control systems have become necessary in order to utilize the longer range guns to the greatest advantage. One example of an aircraft fire control system of this type is described in copending application Serial No. 411,186, now abandoned, for Inter-Aircraft Gun Sight and Computer, filed September 17, 1941, in the names of Carl G. Holschuh and David Fram.

The present invention may be considered an improvement over that disclosed in the above-identified application in that it is particularly adapted for use with a radio sight as well as an optical sight. The present invention is also particularly adapted for use in a stabilized fire control system having a gyro and associated servo mechanisms.

One object of the present invention is to provide an improved computer for fire control apparatus of aircraft.

Another object of this invention is to provide an improved range finder for supplying the range of a target to a computer.

A further object of the invention is to provide a computer for aircraft having an improved mechanism for computing the time of flight of a projectile to a target.

A further object of the invention is to provide a computer for aircraft having an improved prediction device for determining the future position of a target.

A further object of the invention is to provide a computer with a conversion mechanism for converting lateral and slant elevation prediction angles to azimuth and elevation prediction angles.

A still further object of the invention is to provide a computer for aircraft with an improved ballistic correction mechanism for accurately determining ballistic correction angles necessary in order to direct a projectile toward the predicted future position of a target.

Other objects and advantages of the invention will become apparent from the following specification taken in connection with the accompanying drawings, wherein:

Fig. 1 is a diagram showing trigonometric relations involved in the fire control problem, which must be solved by an aircraft computer;

Fig. 2 is a space diagram showing the trigonometric relations of the prediction angles to the angles necessary for offsetting the guns relative to a line of sight in order to direct them toward the predicted future position of the target;

Fig. 3 is a schematic and block diagram of components of an aircraft fire control system including a computer embodying the present invention;

Figs. 4a and 4b are schematic diagrams which, when taken together, show details of the components of the computer shown in Fig. 3;

Fig. 5 is a schematic diagram of a modified form of the time of flight computing mechanism shown in Fig. 4b;

Fig. 6 is a schematic diagram of a further modified form of time of flight mechanism shown in Fig. 4b;

Fig. 7 is a modified form of the conversion mechanism shown in Fig. 4b.

Fire control problem

Considering first the general problem and theory involved in directing the fire of guns mounted on aircraft, reference is made to Fig. 1 wherein a defending aircraft 1 is carrying guns adapted to be directed by the fire control system. An attacking aircraft 2 approaching the defending craft 1 is located at a distance or range ($D_0$) and at an observed angle ($\theta_0$) relative to the longitudinal axis of defending craft 1. The attacking craft may be considered as proceeding on a course 3 and having velocity relative to the defending craft 1 represented by a vector V.

It is possible with either radio or optical sights to determine the distance ($D_0$) of the target or attacking plane 2 and the angle ($\theta_0$) of the line of sight from the defending craft 1 to the target. It is also possible to determine the angular rate of movement of the target 2 relative to the craft 1 by measuring the rate of change of the angle $\theta_0$. This angular rate of change of the line of sight depends upon the relative velocity (V) of the target 2, the range of the target ($D_0$), and the angle between the course 3 and the line of sight. This angular rate ($\dot{\theta}_0$) may be expressed in the following terms:

(1) $$\dot{\theta}_0 = \frac{V \cos \alpha}{D_0}$$

wherein V is the relative velocity of the target 2 along the course 3 and ($\alpha$) is the angle between the course 3 and a line perpendicular to the line of sight as shown in Fig. 1.

The future position of the target, that is, the position of the target after the lapse of a time of flight ($T_p$) of a projectile from the guns to a predicted future position, may be expressed in terms of a prediction angle ($\Delta$) which is the angle between the line of sight and a line of position 5 from the defending craft 1 through a point 6 representing the predicted future position of the target. The time of flight necessary to determine this future position depends upon a number of variable factors including the future range ($D_p$) of the predicted position 6, the indicated air speed of the defending craft 1, the altitude of the defending craft 1, the angle ($\theta_p$) of line of position 5 relative to the axis of the craft 1, as well as certain constants depending upon the particular type of gun used and the muzzle velocity of the gun.

An exact solution of the predicted future position is quite complex. It has been found that a reasonably accurate approximation is possible if certain of the variable factors are eliminated and certain assumptions made. From an inspection of Fig. 1, it will be apparent that $$(2) \quad \sin \Delta = \frac{(V \cos \alpha) T_p}{D_p}$$

wherein $T_p$ is the time of flight of the projectile from a gun on the defending craft 1 to the predicted future position 6 on the target 2 and $D_p$ is the future range of the target.

Equation 2 may be written as:

$$(3) \quad \sin \Delta = \left(\frac{V \cos \alpha}{D_0}\right)\left(\frac{D_0}{D_p}\right) T_p$$

By substituting ($\dot{\theta}_0$) from Equation 1 into Equation 3 we have:

$$(4) \quad \sin \Delta = \dot{\theta}_0 \left(\frac{D_0}{D_p}\right) T_p$$

The future time of flight ($T_p$), in the foregoing equation, is the time required for a projectile to travel to the target, that is, a distance equal to the future range ($D_p$). By determining the time required for a projectile to travel a distance equal to the present range ($D_0$), certain approximations are possible which simplify the solution of the above equation. The time required for a projectile to travel a distance equal to the present range ($D_0$), will hereinafter be referred to as the present time of flight ($T_0$).

It has been found that in almost all cases the ratio of the present time of flight ($T_0$) to the present range ($D_0$) is approximately equal to the ratio of the future time of flight ($T_p$) to the future range ($D_p$). By using this approximation and substituting the present time of flight ($T_0$) in Equation 4, and further assuming, that for the small prediction angle involved, the prediction angle ($\Delta$) derived is approximately equal to $\sin \Delta$, the Equation 4 may be rewritten as $$(5) \quad \Delta = \dot{\theta}_0 T_0$$

Although the observed angular rate ($\dot{\theta}_0$) is less than the future angular rate ($\dot{\theta}_p$) for an incoming target, the present time of flight ($T_0$) is greater than the future time of flight ($T_p$). In this case the true prediction angle ($\Delta$) depends upon the product of the present angular rate and a time of flight greater than the future time of flight. Since the ratio of the present range to the future range is greater than unity, the error in prediction resulting from assuming the present time of flight equal to the ratio of the present range to future range multiplied by future time of flight is small.

In a similar manner it may be reasoned that Equation 5 is equally accurate for receding targets. Thus, by determining the present time of flight ($T_0$) of a projectile from a gun on the defending aircraft 1 to the present position of the target 2, it is possible to predict accurately the future position of a target as the product of the observed angular rate ($\dot{\theta}_0$) and the present time of flight ($T_0$). Having thus determined the prediction angle ($\Delta$) it is possible to add this angle to the angle ($\theta_0$) of the line of sight to obtain the angle ($\theta_p$) of the line of position 5 to the future position 6 of the target. It is then necessary to correct for the effect of ballistics on the shell after it leaves the gun in order to determine the gun aiming angle ($\theta_G$) at which a gun must be positioned to direct a projectile toward the future position 6 of the target.

In addition to the muzzle velocity (MV) of a gun and certain other gun constants, a projectile leaving the muzzle of a gun is affected by the velocity of the aircraft, wind resistance, and gravity. Thus the projectile is affected by a number of variable factors including the future range ($D_p$) of the target, the indicated air speed (IAS) of the craft on which the gun is mounted, the altitude (H) of the craft, and the angular position of the gun ($\theta_G$) relative to the craft. These variables may be utilized to determine a ballistic correction angle ($\delta$) which is the difference between the future position angle ($\theta_p$) and the gun aiming angle ($\theta_G$).

After the ballistic correction angle ($\delta$) has been determined, it may be added to the future position angle ($\theta_p$) of the line of position 5 to obtain the gun aiming angle ($\theta_G$) at which the gun must be positioned in order to direct a projectile toward the future position 6. The gun aiming angle ($\theta_G$) may also be expressed as the sum of the observed angle ($\theta_0$) of the target 2, the prediction angle ($\Delta$) and the ballistic correction angle ($\delta$).

This discussion of the theory involved has been confined to a single plane, which is the plane including the gun on the defending craft 1 and the present and future positions of the target 2. However, equipment used at the present time for aiming guns is movable in lateral and vertical directions about two independent axes, usually referred to as azimuth and elevation movements. It is necessary, therefore, to resolve the angles which have been discussed into lateral and vertical components.

*Tracking system*

A fire control system for aircraft embodying the present invention may be arranged for either automatic or manual operation and used with either radio or optical sighting systems. Referring to Fig. 3, a radio sight is designated generally at 11 and includes a scanner mechanism 12 carrying a directional antenna 13 which is connected in a suitable manner to a radio transmitter 14 and receiver 15 of the ultra high frequency type. The operation of the radio receiver and transmitter does not form a part of the present invention, so a detailed description is believed unnecessary.

Ultra high frequency energy generated by transmitter 14 is usually radiated by directional antenna 13. Energy reflected by a target is received by the antenna 13 and supplied to the receiver 15 to which are connected azimuth and elevation phase-sensitive amplifiers 17 and 18, which are of suitable design to produce electrical signals at terminals 19 of a switch 21 corresponding to the lateral and vertical displacement of the axis of the directional antenna 13 relative to the target.

If the system is to be used for automatic tracking, the switch 21 is closed to the terminals 19. The lateral and vertical error voltages are thus supplied to a gyro unit 23 as by leads 24 and 25 to apply torque to the gyro in a manner subsequently described to cause it to precess in a direction to follow movements of the target.

When the system is used for manual tracking, the switch 21 is closed to terminals 27 so the torques applied to the gyro unit 23 are controlled by a tracking control handle designated generally at 29. These handgrips are movable about vertical and horizontal axes to effect corresponding displacement of the line of sight. The tracking control handle is of conventional design which includes grips 31, that may be rotated about a vertical axis to drive through gearing 32 to rotate a slider 33 of a potentiometer 34 which is mounted on a shaft 35. The terminals of the potentiometer 34 are connected to a battery 36, the midpoint of which is connected as by lead 37 to the midpoint of potentiometer 34. The midpoints of the battery and potentiometer are also connected to ground. In this manner a voltage is produced between a lead 38 connected to the slider 33 and ground, having a polarity and magnitude corresponding to the direction and amount of angular displacement of the hand grips 31 about the vertical axis.

Similarly, movements of the hand grips about the horizontal axis cause a pinion 41 to translate a cylindrical rack 42 whereby another cylindrical rack 43 drives a pinion 45, to move a slider 46 of potentiometer 47 which is mounted on a shaft 48. The potentiometer has its terminals connected to a battery 49, the midpoint of which is connected to the midpoint of potentiometer 47 and to ground. The voltage between lead 51 connected to the slider 46 and ground has a sense and magnitude corresponding to the direction and amount of the angular displacement of the hand grips 31 about the horizontal axis. The leads 38 and 51 are connected to terminals 27. When the switch 21 is closed to the terminals 27, the leads 38 and 51 are connected to leads 24 and 25 respectively.

Referring now to Fig. 4a, the manner in which torques are applied to cause a gyro to precess and track a target will be described. The voltage corresponding to the azimuth signal from either the tracking handle 29 or the radio sight 11 is supplied by lead 24 to an azimuth torque motor amplifier 55 (Fig. 4a), which is adapted to control the torque applied by a torque motor 56 to a horizontal axis 57 of the gyro designated generally at 59.

The gyro includes a main supporting shaft 61, which carries a bracket 62 for movement about a vertical axis 63. A housing or follow-up member 65 is supported in the bracket 62 by horizontal trunnions 64, 64, which also support gimbal ring 66. A gyro rotor 67 having a spin axis 68 is pivotally supported for movement about the vertical axis 63 within the gimbal ring 66. A ring 71 is supported by trunnions 72 and 73 in the housing 65 for movement about the vertical axis 63. A shaft 74 connected to the rotor 67 and coincident with the spin axis 68 thereof is restrained in a slot 75 to move the ring 71 as the rotor 67 moves about the vertical axis 63. The torque motor 56, and a similar torque motor 78 for applying torque about the vertical axis 63, are both carried by the housing 65.

Torque applied by the motor 56 about the horizontal axis 57 is transmitted by gimbal ring 66 and trunnions 81 and 82 to the rotor 67, causing it to precess about the vertical axis 63. Similarly, torque applied to the rotor 67 about the vertical axis 63 is transmitted by ring 71 and shaft 74, causing the rotor 67 to precess about the horizontal axis 57.

A pick-off such as "E-transformer" 83 is carried by the housing 65 and has a movable armature 84 mounted on the ring 71. Movement of the rotor 67 about the vertical axis 63 produces a reversible phase, variable magnitude voltage in the output of the coils of pick-off 83 corresponding to the direction and amount of the displacement of the armature 84 relative to the pick-off 83. Pick-off transformers of the kind referred to are well-known devices and suitable ones are disclosed in Patent No. 2,407,657 to O. E. Esval, issued September 17, 1946, and Patent No. 2,412,614 to R. Haskins, Jr., et al., issued Dec. 17, 1946.

A similar pick-off or "E transformer" 86, also carried by the housing 65, has a movable armature 87 on the gimbal ring 66 whereby a reversible phase, variable magnitude voltage is produced at leads 88 corresponding to the direction and amount of the displacement of the armature 87 relative to the transformer 86. Thus signals are produced at leads 85 and 88 corresponding to movements of the rotor 67 about the vertical axis 63 and the horizontal axis 57, respectively. The signals produced at leads 85 are supplied to an amplifier 91 which controls a servomotor 92 to move the housing 65 in a manner to follow movements of the ring 71. Similarly, the voltage at leads 88 is supplied to an amplifier 93 which controls a servomotor 94 to move the housing 65 about the horizontal axis 57 to follow movements of the gimbal ring 66.

The amplifier 91 includes a transformer 95 by which the voltage of leads 85 is applied in phase opposition to phase detecting tubes 96 and 97 which are arranged in a conventional phase detector circuit, having a reference voltage from a source 98 applied through transformer 99 in like phase to the two tubes.

When the armature 84 is centered relative to the transformer 83, no error signal is produced at leads 85. In this case equal voltages appear across load resistors 101 and 102 of the phase detector circuit. Displacement of the armature 84 introduces an error voltage which adds to the reference voltage in the circuit of one of the tubes 106 or 107 and subtracts in the circuit of the other tube. Thus, the voltage across one of the load resistors 101 or 102 increases while the other decreases depending upon the phase of the error voltage, as determined by the direction of the displacement of armature 84. The difference between the voltages across the load resistors 101 and 102 corresponds to the amount of the displacement of the armature 84 relative to the transformer 83.

The voltage across load resistors 101 and 102 is applied through suitable differentiating networks 103 and 104 to the grids of amplifying tubes 106 and 107. A source of positive voltage such as battery 108 is connected to the plates of the amplifying tubes 106 and 107 through windings 109 and 111 of the servomotor 92. The currents through windings 109 and 111 depend upon the voltage applied to grids 106 and 107. Since the difference between the grid voltages corresponds to the direction and amount of the displacement between armature 84 and transformer 83, the motor is rotated in a direction and at a speed corresponding to the direction and amount of said displacement. Motor 92 drives through shaft 112 and gearing 113 to rotate the shaft 61 carrying the bracket 62 and thus positions the gyro housing 65 about vertical axis 63. When the housing 65 is so positioned that the armature 84 is centered relative to the core of transformer 83, the voltage between leads 85 is zero, so the motor 92 develops no torque and therefore does not rotate.

The differentiating or rate networks 103 and 104 produce derivative signals which aid the stabilization of the servo system.

The shaft 112 also drives through gearing 114 to position the rotor of a suitable self-synchronous transmitter 110 that is energized by a source 120. The transmitter supplies a voltage by leads in cable 100 having a phase relation with the source 120 corresponding to the angular displacement of the transmitter 110. Transmitter 110 may be of any conventional design such as "Selsyn," "Autosyn," or "Telegon" to control a servo mechanism 125 (Fig. 3) to position the scanner 12 in accordance with the azimuth position of the gyro housing 65.

The amplifier 93 controls servomotor 94 in a similar manner as the amplifier 91 controls servomotor 92. The voltage from leads 88 is compared in phase with a reference voltage from source 115 by a phase detecting circuit including tubes 116 and 117. The output voltage of tubes 116 and 117 is applied to the grids of amplifying tubes 118 and 119, which can control the current in windings 121 and 122 of the motor 94. In this manner the direction and speed of rotation of shaft 127 correspond to the direction and amount of the displacement of the armature 87 relative to the core of transformer 86.

The shaft 127 forms one input of a compensating differential 128, the other input of which is driven from gearing 113 whereby output gear 129 drives through gears 131, shaft 132, and gearing 133 to rotate shaft 134. The shaft 134 in turn drives through gearing 135 to position shaft 64 and the housing 65 about the horizontal axis 57. Thus the pick-off 86 and amplifier 93 control the servomotor 94 to cause the housing 65 to follow movements of the gyro rotor 67 about the horizontal axis 57. The compensating differential is used in a conventional manner to avoid undesired movement of the gyro housing about the horizontal axis 57 upon rotation of the housing about the vertical axis 63.

The shaft 127 also drives through gearing 138 to position the rotor of a position transmitter 139 that is energized from a source 141. Output leads 142 from the transmitter 139 carry a voltage displaced in phase in accordance with the direction of rotation of the shaft 127. This voltage controls an elevation servo mechanism 143 (Fig. 3) to position the scanner 12 in elevation to correspond with the elevation position of the gyro rotor 67.

Since the scanner 12 follows movements of the rotor 67, the gyro acts as a stabilizer so the scanner is stabilized in space.

In addition to the radio sight, the system also includes an optical sight designated generally at 151 and including a sighting prism 152 arranged to be rotated in elevation about a horizontal axis by a worm 153 and sector 154. The prism 152 is adjusted in azimuth about a vertical axis by gearing 155 in any suitable well-known manner. The voltages appearing on leads 100 and 142 also control suitable servo mechanisms 157 and 158 to position the sighting prism 152 in azimuth and elevation in accordance with the position of the gyro rotor 67, thereby stabilizing the optical sight in the same manner as the scanner 12. The image of a target is reflected by the prism 152 through adjustable stadia lines 163 arranged to be moved in opposite directions by a lead screw 164 to determine the range of an object, as will subsequently be described. The image is then reflected by reflector 165 to an eye-piece 161.

When the switch 21 is closed to the terminals 27 for manual tracking, voltages are supplied through leads 24 and 25 to azimuth and elevation torque motor amplifiers 55 and 171 respectively. A voltage from the potentiometer slider 33 corresponding to the azimuth position of hand grips 31 is supplied by lead 24 to grid 173 of tube 174 which includes a cathode 175 and a plate 176 connected in a differential amplifier circuit including tube 185. Positive voltage is supplied to the plate 176 from a source such as battery 177 through load resistor 178. A negative voltage is supplied from a battery 179 through a common cathode resistor 181 to the cathode 177. Suitable bias is provided for the grid 173 by a battery 183 connected through a grid-leak resistor 184 to the grid 173. A second tube 185 has its plate connected to battery 177 through a load resistor 186 and its grid 180 connected to bias battery 183 through resistor 187. The circuit of cathode 188 is connected through cathode resistor 181 and the battery 179 to ground.

If no signal is received by lead 24, equal currents are drawn by tubes 174 and 185, and the grids 173 and 180 are at the same potential.

The current normally drawn by the tubes 174 and 185 is determined by the value of common cathode resistor 181 and the battery 179. It will be apparent that the current increases until the drop across resistor 181 offsets the voltage of battery 179.

Similarly, the voltages across the load resistors 178 and 186 are equal, so equal voltages are applied through resistors 191 and 192 to grids 193 and 194 of amplifier tubes 195 and 196. Cathodes 197 and 198 of the amplifying tubes 195 and 196 are connected through cathode resistors 199 and 201 to ground. A negative bias is supplied from a source such as battery 202 through resistors 203 and 204 to the grids 193 and 194. A source of positive voltage, such as battery 205, is connected through the mid-point of winding 206 of the torque motor 56 to plates 207 and 208 of the tubes 195 and 196. With equal voltages on the grids 193 and 194, currents through the two tubes 195 and 196 and the two halves of winding 206 are equal so no torque is applied to the horizontal axis 57 by the motor 56.

If a positive voltage is applied by the lead 24 to the grid 173, current in the tube 174 and the drop across load resistor 178 increase, as does the current through common cathode resistor 181. This increase in current through common cathode resistor 181 raises the cathode voltage, thereby making the grid-cathode voltage more negative and reducing the current drawn by tube 185 as well as the voltage drop across load resistor 186. The voltage differential across resistors 178 and 186 is thus applied to grids 193 and 194, thereby changing the currents through the tubes 195 and 196 and the two halves of winding 206.

The difference in the current in the two halves of winding 206 causes torque motor 56 to apply torque to horizontal axis 57. The torque applied has a direction and magnitude corresponding to the polarity and magnitude of the voltage appearing at lead 24. Thus, if the voltage of the lead 24 is negative instead of positive, torque motor 56 will apply torque in an opposite direction.

Similarly, the elevation control voltage of lead 25 is applied to the grid of tube 211 which is connected in a differential amplifier circuit with tube 212. Due to the action of common cathode resistor 213, the signal of lead 25 causes the current drawn by one of the tubes to increase whereas that drawn by the other decreases, and the voltage across their corresponding load resistors 214 and 215 changes in opposite directions. This change in the voltage across load resistors is amplified by tubes 217 and 218 having calibrated cathode resistors 219 and 221 to control the current through the two halves of winding 222 of the torque motor 78. The torque applied by the motor 78 about the vertical axis is controlled in this manner so it corresponds in direction and magnitude to the polarity and magnitude of the voltage applied by lead 25.

It is a characteristic of gyroscopes that, when a torque is applied about one axis, the gyro rotor precesses about a second axis at a rate proportional to the torque applied. Since the torque applied by the torque motors 56 and 78 depends upon the difference between the currents in the two halves of the windings 206 and 222, signals proportional to these current differences will also be proportional to the torque applied. In the case of the torque motor 56, the currents drawn by tubes 195 and 196 correspond to the difference in the currents through the two halves of the winding 206. The voltages across calibrated cathode resistors 199 and 201 have a voltage differential proportional to the torque applied by the motor 56 and corresponds to the azimuth precession rate of the gyro rotor 67 about the vertical axis 63. These voltages are connected by leads 225 and 226 across potentiometers 227 and 228 of a prediction mechanism 229.

In a similar manner the difference in the voltages across resistors 219 and 221 in the cathode circuits of tubes 218 and 219 is proportional to the torque applied by the motor 78 about the vertical axis 63 and corresponds to the elevation precession rate of the gyro rotor 67. These voltages are connected by leads 231 and 232 across potentiometers 233 and 234 of the prediction mechanism 229.

As will be described in detail subsequently, the angular rates represented by the voltages of leads 225 and 226 correspond to the precession rate of the gyro in a lateral plane including the spin axis 68. The elevation rate, represented by leads 231 and 232, corresponds to the elevation precession rate of the gyro rotor 67 in a vertical plane perpendicular to the lateral plane and also including the spin axis 68.

When the switch 21 is closed to terminals 19 representing the automatic tracking position, the voltages from the azimuth and elevation phase sensitive amplifiers 17 and 18 are applied by leads 24 and 25 to the amplifiers 55 and 171, respectively, to cause the gyro rotor 67 to precess to follow movements of the target. In this manner, the spin axis of the gyro is maintained coincident with the line of sight to the target.

Since the gyro housing 65 follows movements of the rotor 67 and the scanner 12 follows movements of the housing 65, the scanner will be continuously directed toward the target and will thus automatically track the target.

*Range computer unit*

In addition to data corresponding to the angular position of the target, the computer must be supplied with data corresponding to the range of the target.

The range may be determined optionally with the radio sight or the optical sight, depending upon prevailing conditions of visibility, and so forth. In the case of the radio sight, the range is determined automatically by a known apparatus which is not a part of the present invention. When determining the range by using the optical sight, knob 263 is adjusted with reference to a scale (not shown) to set in the dimensions of the target and the operator controls the position of a foot pedal 241 (Fig. 3) which, as will appear, controls the rate of motion of stadia lines 163 which are positioned to just bracket the target. In doing so, the range foot pedal 241 controls the position of a slider 242 on potentiometer 243, the terminals of which are connected to a battery 244 having its center-point grounded. When the operator is accurately tracking the target, the voltage of slider 242 is proportional to range rate ($\dot{D}_0$) and has a positive or negative polarity, depending on whether the range is decreasing or increasing as the target approaches or recedes from the defending craft. The method of measuring range by adjusting stadia lines to bracket a target of known dimensions is well known.

This range rate voltage is connected through a differentiating network composed of resistance 245 and condenser 246 to a terminal 247 of a switch 248. The differentiating network produces a rate signal which anticipates changes and assists the operator in tracking. When the switch 248 is closed to the terminal 247, the range rate voltage is supplied to a range computer unit 251. The range computer unit 251 produces a voltage proportional to range ($D_0$) in a manner to be described.

This voltage proportional to range is supplied by a lead 334 to grid 252 of amplifying tube 253, which has a resistor 254 connected between cathode 255 and a lead 256. This is a conventional cathode follower circuit in which the voltage of lead 256 changes in proportion to the voltage applied to grid 252. However, in order to have the voltage of lead 256 equal to zero when the voltage on grid 252 is zero, a negative voltage from a source 257 is connected through a resistor 260 and resistor 254 to the cathode 255. The values of the resistances are so chosen that the lead 256 is at ground potential when there is zero voltage applied to the grid 252. Since the voltage applied to grid 252 corresponds to the range ($D_0$) of the object, an amplified voltage proportional to the range ($D_0$) appears at lead 256 and is applied across potentiometer 258. A slider 259 for the potentiometer 258 is positioned by a shaft 261 according to the position of the stadia lines 163.

It is well known that in conventional stadiometric range finders the ratio of the distance (d) between stadia lines to the focal length (f) of the optical system from the stadia lines to the focal point is equal to the ratio of the dimensions of the target (TD) to the total range ($D_0$). The dimensions of the wing spread of enemy airplanes is known to the gunners operating the apparatus.

The present range computer is based upon this principle and is designed to equate the target dimensions (TD) to the product of the distance ($d$) between the stadia lines and the total range ($D_0$) divided by the focal distance ($f$) from the stadia lines. A voltage proportional to the target dimensions (TD) is set into the mechanism by rotation of a handwheel, 263, with reference to a target dimension scale, not shown. This hand wheel is arranged to position slider 264 of potentiometer 265, the terminals of which are connected to a battery 266. The voltage at the slider 264 is proportional to the target dimensions and is applied to grid 267 of tube 268. Cathode 269 of tube 268 is connected to cathode 271 of tube 272, which has its grid 273 connected to the slider 259 of potentiometer 258. Plates 275 and 276 of tubes 268 and 272 are supplied with positive voltage from a source such as battery 277, which is connected to the midpoint of winding 278 of motor 279.

It is desirable, in order to properly control the motor 279, for certain currents to be flowing through the tubes 268 and 272 at all times. This is accomplished by applying a negative voltage from ground to the cathodes 269 and 271 as by battery 270, which is connected through a resistor 274 to the cathodes 269 and 271. With this arrangement a normal current flows through tubes 268 and 272 until the drop across resistor 274 offsets the negative voltage of battery 270.

The motor 279 drives through gears 281 and 282 to rotate lead screw 164 and thereby position stadia lines 163 so that they just enclose the target. The position of the stadia lines 163 determines the distance ($d$) between them. Since the focal distance ($f$) from the stadia lines is substantially constant, the quotient $d/f$ of the distance ($d$) divided by the distance to the focal point may be determined by the ratio of a gear 284 to the gear 282 whereby the shaft 261 is rotated in accordance with this quotient. As has been previously explained, a voltage proportional to range ($D_0$) is supplied to the potentiometer 258. Since the slider 259 is rotated in accordance with the quotient ($d/f$), the voltage appearing at the slider 259 is propotional to the expression $$\frac{d \times D_0}{f}$$

This voltage is applied to grid 273, whereupon different currents flow through the two halves of winding 278 of the motor 279, thereby causing the motor to rotate in one direction or another, depending upon which of the currents is larger. The rotor 279 therefore adjusts the stadia lines 163 until the voltage applied to the grid 273 is equal to the voltage applied to grid 267. This, of course, is dependent upon the voltage applied to the grid 252 of the tube 253, which, as has been explained, is proportional to the range ($D_0$) and depends in turn upon the position of slider 242 which is adjusted by the range foot pedal 241.

The voltage from switch 248 is supplied to the range computer by a lead 291, which is connected to grid 292 (Fig. 4b) of a tube 293, that is arranged in a balanced amplifier circuit similar to that of the tubes 268 and 272 which control the motor 279. The tube 293, together with tube 294, controls range servomotor 295, having a shaft 296 which is adapted to drive a logarithmic function of the range ($D_0$) into the computing mechanism. Shaft 296 drives through gear 297 and shaft 298 and gear 299 to position an antilogarithmic cam disc 301 having a groove 302 designed to position sector follower racks 303 and 304 and thereby rotate pinions 305 and 306. Since the cam disc 301 is rotated in accordance with the logarithmic function of the range ($D_0$), the pinion 305 is rotated in accordance with range ($D_0$) and drives through a shaft 306 to position a slider 307 of potentiometer 308 in accordance with range ($D_0$).

The potentiometer is supplied with a voltage by lead 309 corresponding to the voltage output of a permanent-magnet generator 311, which is driven by the range motor 295 through gearing 312. The voltage output of the permanent-magnet generator 311 represents the differential of the output of range motor 295. Since the output of range motor 295 as represented by shaft 296 is proportional to logarithmic function of the range ($D_0$), the differential of this is the quotient of range rate ($\dot{D}_0$) divided by range ($D_0$). This voltage is supplied by the lead 309 to potentiometer 308 where it is multiplied by the value of range ($D_0$) as determined by the position of slider 307. This provides a voltage proportional to range rate ($\dot{D}_0$) which is applied to grid 313 of the tube 294.

Plates 314 and 315 of the tubes 293 and 294 are supplied from a suitable source such as battery 316 connected to the mid-point of winding 317 of the range motor 295. It will be apparent that the currents in the two sides of winding 317 will be unequal when unequal voltages are applied to the grids 292 and 313. This causes the range motor 295 to rotate in a direction which adjusts the slider 307 of potentiometer 308 until the voltage of the grid 313 is equal to the voltage of the grid 292. Cathodes 318 and 319 of the tubes 293 and 294 are connected through a resistor 321 to a source of negative voltage such as battery 322. This negative voltage causes normal current to flow through the two tubes until the drop across resistor 321 offsets the negative voltage of the battery. This is done in order to have a minimum current through both halves of the winding 317 to provide a more accurate control of the motor 295.

As has been explained, the sector rack 304 is moved by the anti-logarithmic cam disc 301 to rotate the pinion 306. The gear ratio of pinion 306 is selected in a manner to divide the range ($D_0$) as determined by the rack 304 by a value of the muzzle velocity (MV) of the guns being used with the computer. This is done to provide a portion of the time of flight solution, which will hereinafter be described in more detail. The pinion 306 drives through gearing 325, shaft 326, and gearing 327 to rotate a spur gear 328 which meshes with a pinion 329 to position slider 331 of the potentiometer 332. The ratio of pinion 329 to spur gear 328 is arranged to eliminate the muzzle velocity factor which was introduced by the pinion 306. Hence, the slider 331 is positioned in accordance with the range ($D_0$). The terminals of potentiometer 332 are connected to a voltage source such as battery 333. The voltage of the slider 331 is proportional to the range of the target and is supplied by lead 334 to the grid 252 (Fig. 3) of tube 253 for controlling the motor 279 as heretofore described.

The range computer thus far described has been for use with the optical range finder which is controlled by the range foot pedal 241. While the optical range finder is in use, the switch 248 is closed to the terminal 247 and switch 335 (Fig. 4b) is closed to the terminal 336. When the automatic radio range computer 341 of the radio sight 11 is used, the range computer 251 is used in a slightly different fashion. Switch 248 is closed to terminal 342, which represents its automatic position, and switch 335 (Fig. 4b) is closed to terminal 343.

An automatic radio range finder 341 may include a known phase shifting network (not shown in the drawings since it is not a part of the present invention) which is adjusted to measure the time interval between the transmission of a pulse of high frequency energy by the antenna 13 and the reception of a reflected pulse of energy by the antenna. In the system illustrated, the phase shifting network includes a rheostat 344 which is connected to the automatic radio range finder 341 (Fig. 3) by leads of a cable 345. A slider 346 on the rheostat 344 is positioned in accordance with the range ($D_0$) as determined by the pinion 305 which drives through gears 347.

The position of the slider 346 on the rheostat 344 acts to determine the phase shift effected by the phase shifting network of the automatic radio range finder 341.

A range error signal is supplied from the radio range finder 341 by a lead 351 to the terminal 342 of the switch 248. This range error signal is now connected by lead 291 to the grid 292 (Fig. 4b) of the tube 293. Since the switch 335 is closed to terminal 343, the signal output of the permanent-magnet generator 311 is connected to the grid 313 of the tube 294 through a suitable differentiating network composed of resistor 353 and condenser 354. Thus, a voltage appears across resistor 355, which is proportional to the output of the permanent-magnet generator 311, that is, the rate of change of the output of the range motor 295. Since the voltage now supplied to the grid 292 is an error signal, the range motor 295 will drive through the anti-logarithmic cam disc 301 until the phase shift as determined by potentiometer 344 represents the correct value of range measured by the automatic range finder 341. When this occurs, the error signal of lead 351 is zero. The voltages applied to the grids 292 and 313 are both zero since the range motor 295 and the generator 311 stop rotating.

From this description of the range computing unit 251, it will be apparent that the output shaft 296 of the motor 295 drives a logarithmic function of range ($D_0$) into the computer. The logarithmic function just mentioned, and other functions referred to herein are determined by graphic procedure from ballistic tables supplied by the government. The method of deriving desired functions is well-known to those skilled in the art. Since such functions vardy in accordance with the geometric and dynamic characteristics of different kinds of projectiles, no specific functions are mentioned herein.

The range computing unit 251 also includes apparatus for supplying a range rate ($\dot{D}_0$), which is represented by the rotation of shaft 361, that is driven by range rate motor 362. This range rate motor is controlled by a balanced amplifier circuit including tubes 363 and 364, the plates of which are connected through opposite halves of winding 365 to a source of positive potential such as battery 366. Grid 367 of the tube 364 is supplied with a voltage from a slider 307 of potentiometer 308 corresponding to range rate ($\dot{D}_0$) as has already been described. The range rate motor rotates and drives through gearing 369 to position slider 371 of potentiometer 372. The terminals of the potentiometer 372 are connected to a battery 373, the midpoint of which is connected to ground. A voltage having a polarity and magnitude corresponding to range rate is applied from slider 371 to grid 375 of tube 363 so the range rate motor 362 rotates until the voltage of slider 371 is equal to the range rate voltage applied to grid 367. A suitable source of negative potential, such as battery 377, is connected through resistor 378 to cathodes of tubes 363 and 364 in order to provide a certain normal current through the winding 365 of the motor 362.

It will be apparent that the shaft 361 of range rate motor 362 rotates in accordance with a function of range rate ($\dot{D}_0$). The motor shaft 361 drives through gearing 379 to rotate shaft 381 in accordance with the function of range rate ($\dot{D}_0$).

*Time of flight unit*

In order to predict the future position of a target, it is necessary to determine the time of flight of a projectile from guns on the defending craft to the observed position of the target. As has been explained, the present time of flight ($T_0$) may be combined with angular rates of movement of an attacking craft or target to determine a prediction angle ($\Delta$).

The present time of flight depends upon many factors. In order to reduce errors in computation of time of flight ($T_0$), the calculation may be divided into two parts, namely, that part which represents the time of flight in a vacuum ($T_v$), which is approximately a linear function of range ($D_0$), and that part which depends upon the other variable functions. The latter part, which is hereinafter referred to as the difference in the time of flight ($\Delta T_0$), is also a function of range, but in addition includes functions of the altitude and air speed of the target as well as functions of the gun position angles. Three time-of-flight mechanisms are described herein; however, the preferred and simplified form is that shown in Fig. 4b as a component part of the computer. However, the other forms, which will be hereinafter described, may be more accurate under certain circumstances and may be used in the computer if desired. It has been found by experiment that the future range, the azimuth position of the guns of the defending craft, and the altitude of the craft have the greatest effect upon the time of flight. Since the airspeed usually varies between comparatively small limits during normal flight, an average value of airspeed may be used. Similarly, an average value of the elevation angle of the guns may be used.

Since it is desired to determine the present time of flight ($T_0$), it is possible to substitute the observed azimuth ($A_0$) of the target for the azimuth position of the gun ($A_g$) since the only difference between these angles would be the azimuth ballistic correction angle. This is sufficiently small that it does not materially affect time-of-flight computations.

The time of flight ($T_v$) of the projectile in a vacuum is determined by the shaft 326 which, as was explained in connection with the range computer, is rotated in accordance with the quotient of the range ($D_0$) divided by the muzzle velocity (MV) of the guns. This value of $T_v$ is supplied by shaft 326 directly to the time of flight unit 385 (Fig. 3). The logarithmic function of range ($D_o$) represented by shaft 296 is also supplied to the time of flight unit 385. The observed azimuth ($A_o$) position of the target is supplied by the shaft 112 of the gyro unit 23 through gearing 386 and shaft 428 (Fig. 3) to the time of flight unit 385.

The only other function necessary to operate the time of flight unit 385 is the function of altitude. A handwheel or knob 388, which may be positioned at a remote point from the computer such as the pilot's or navigator's compartment, is adjusted on a logarithmically calibrated scale to rotate shaft 389 and winding 391 of a self-synchronous transmitter 392, such as a "Selsyn" or "Telegon," in accordance with a logarithmic function of altitude (H). The winding 391 is energized from a suitable source 393 and induces voltage in stator winding 394.

The stator 394 is connected to a stator 395 of a self-synchronous receiver 396 having its rotor 397 connected to the primary 398 of a coupling transformer which has split secondary windings 399 and 401. The voltage of primary 398 is applied in phase opposition to plates of phase detecting tubes 402 and 403. The voltage of a source 404 which is synchronized with the source 393 is supplied by transformer 405 in like phase to the plates of the tubes 402 and 403. This is a conventional phase detecting circuit in which the differences of the direct current voltages appearing across resistors 406 and 407 in the circuit of tubes 402 and 403 correspond to the direction and amount of the displacement of the receiver rotor 397 relative to the transmitter rotor 391. These difference voltages are connected through condenser and resistor differentiating networks 408 and 409 to amplifying tubes 411 and 412, having the two halves of winding 413 of altitude servo motor 414 in their anode circuits.

The motor 414 drives through worm gear 415 and worm wheel 416 to position shaft 417 which drives through gearing 418 to position shaft 419. The rotor 397 is positioned by the shaft 419 until the position of the receiver rotor 397 corresponds to the position of transmitter rotor 391. When this occurs, the voltages across resistors 406 and 407 are equal, and the motor 414 is stationary since the currents in the two halves of the winding 413 as determined by amplifying tubes 411 and 412 are equal.

When an equilibrium position is reached, the position of shaft 419 corresponds to the position of the shaft 389 and handwheel 388; hence, shaft 419 is positioned in accordance with a logarithmic function of altitude (H).

Shaft 419 drives this function of altitude through gearing 421, shaft 422, and gearing 423 to position shaft 424, which drives the logarithmic function of altitude (H) into the time of flight unit 385.

The difference in time ($\Delta T_o$), which must be combined with the time of flight in a vacuum ($T_v$) to determine the present time of flight ($T_o$), is a function of the product of the three variable functions, as has heretofore been described. These variable functions are functions of range ($D_o$), altitude (H), and azimuth ($A_o$). The product of these three functions may be easily obtained by adding their logarithms. Logarithmic functions of range ($D_o$) and altitude (H) are introduced into the time of flight unit 385 by shafts 296 and 424.

The observed azimuth ($A_o$) of the target is driven through shaft 112 (Fig. 4b), gearing 425, shaft 426, and gearing 427 to rotate shaft 112', which drives through gearing 386 to rotate shaft 428 in accordance with the observed azimuth ($A_o$) position of the target. The shaft 428 drives through pinion 429 to position a logarithmic cam disc 431 having a cam groove 432, which positions a sector rack 433 in accordance with the logarithmic function of the azimuth position of the target ($A_o$). The sector rack 433 drives through pinion 434, shaft 435, gearing 436 to position shaft 437, which represents one input of a differential 438.

The logarithmic functions of range ($D_o$) and altitude (H) as represented by rotation of shaft 296 and 424 are added in differential 437 having output shaft 441 which drives a second input of the differential 438. It will be apparent that the shaft 441 is positioned in accordance with the sum of the logarithms of range ($D_o$) and altitude (H). The differential 438 adds the logarithmic function of azimuth ($A_o$) to these two functions and positions output shaft 442 in accordance with the sum of the three logarithmic functions. The shaft 442 drives through pinion 443 to position an anti-logarithmic cam disc 444 having a cam groove 445 which moves a sector rack 446 to rotate pinion 447.

Since the input to the anti-logarithmic cam disc is the sum of the logarithms of functions of range ($D_o$), altitude (H) and observed azimuth ($A_o$), the output of the anti-logarithmic cam 444 moves gear sector 446 to rotate pinion 447 on shaft 448 according to the product of these three functions. The shaft 448, representing one input of a differential 449, is thus positioned in accordance with the value of the difference in time of flight ($\Delta T_o$). This difference in time of flight ($\Delta T_o$) is combined with the time of flight in a vacuum ($T_v$) as represented by shaft 326, which also drives an input of the differential 449. The output of the differential 449 as represented by shaft 451 is thus positioned in accordance with the time of flight ($T_o$) of a projectile to the target.

The rotation of shaft 451 representing the time of flight ($T_o$) drives through gear 452, shaft 453, and gearing 454 (Figs. 3 and 4a) to rotate shaft 455 to drive the time of flight ($T_o$) into the prediction unit 229.

This form of time of flight mechanism is the simplest and preferred form since it provides sufficient accuracy for use in the computer being described. However, the accuracy of the result is increased by the introduction of additional variables into the time of flight mechanism. Figs. 5 and 6, showing modified form of the time of flight mechanism, include additional variables.

Fig. 5 illustrates a time of flight mechanism which utilizes five variables for determining the time of flight ($T_o$). These variables include range ($D_o$), altitude (H), indicated air speed (IAS), gun azimuth ($A_g$), and gun elevation ($E_g$). In these mechanisms that portion or component of the time of flight, which is a linear function of range, is computed separately from that portion of the time of flight, which is a variable function depending upon the effect of various forces on the projectile. The time of flight in a vacuum ($T_v$), which is a linear function of range, may be determined by rotation of shaft 461 which drives into a differential 462.

The change in time of flight ($\Delta T_o$), which must be added to the time of flight in a vacuum ($T_v$), has been found to be the product of a function of range ($D_o$) and a function of altitude (H), that is raised to power corresponding to a function of the gun position angles, namely, azimuth ($A_g$) and elevation ($E_g$), which is in turn raised to a power which is a function of indicated air speed (IAS).

The gun position angles ($A_g$ and $E_g$) are introduced by shafts 463 and 464, which rotate and translate a cam 465, the surface of which is such that the lift of a follower 466 riding thereon represents a logarithmic function of gun azimuth and elevation angles. This logarithmic function of gun azimuth and elevation angles is raised to a power which is a function of indicated air speed by translating a three-dimensional cam 467 by the follower 466 in accordance with the logarithmic function of gun azimuth and elevation angles and rotating the three-dimensional cam 467 in accordance with indicated air speed (IAS) as represented by shaft 468. A follower 469 riding on the surface of cam 467 may be positioned in accordance with the product of a function of indicated air speed and the logarithmic function of gun azimuth and elevation. The follower 469 includes a rack 471 which drives through pinion 472, shaft 473, and gearing 474 to rotate a shaft 475 representing one input of differential 476.

In order to raise the funtion of altitude to the power of the function of gun azimuth and elevation angles, which is in turn raised to a power of indicated air speed, it is necessary to add the double logarithmic functions of altitude to the product of indicated air speed and the logarithmic function of gun azimuth and elevation angles. A shaft 478 is rotated in accordance with a double logarithmic function of altitude by a pinion 456 which meshes with a rack follower 457 that rides on the surface of a logarithmic cam 458. The cam 458 is driven by a shaft 459 in accordance with a logarithmic function of altitude (H) which may be driven from the shaft 424 of the computing mechanism heretofore described. Since the shaft 459 is driven in accordance with a logarithmic function of the altitude (H), the follower 457 drives shaft 478 in accordance with a double logarithmic function of the altitude (H).

The shaft 478 drives this double logarithmic function into the differential 476 where it is combined with the rotation of shaft 475. The output of the differential 476 drives shaft 479, which rotates an anti-logarithmic cam 481, having a follower 482 riding on the surface thereof which is displaced in accordance with the product of the logarithmic function of altitude and a function of azimuth and elevation angles raised to a power of indicated air speed.

This product acts through a rack 483 on the lift 482 to rotate pinion 484 and shaft 485, which represents one input of a differential 486. The other input of differential 486 is driven in accordance with logarithmic function of range ($D_0$) by a shaft 487. The shaft 461, which is positioned in accordance with range, rotates a logarithmic cam 488 having a follower 489 which is displaced in accordance with a logarithmic function of range and acts through rack 491 and pinion 492 to position the shaft 487. The output of the differential 486 as represented by shaft 493 is the sum of the logarithmic function of range ($D_0$) and the product the logarithmic function of altitude (H) and gun azimuth and elevation angles ($A_g$ and $E_g$) raised to the power of indicated air speed and logarithmic function of altitude (H). Shaft 493 positions a second anti-logarithmic cam 494 having a follower 495 riding on its surface, which is positioned in accordance with the the product of functions of range and altitude, the function of altitude being raised to a power corresponding to the sum of gun azimuth and elevation angles ($A_g$ and $E_g$), which function is in turn raised to a power of indicated air speed.

The follower 495 includes a rack 496 which drives pinion 497 to rotate a shaft 498, which represents the change in time of flight ($\Delta T_0$), which must be added to the time of flight in a vacuum ($T_v$) to obtain the time of flight ($T_0$) of a projectile to the target. The addition of the time of flight in a vacuum ($T_v$) and the change in time of flight ($\Delta T_0$) is accomplished by the differential 462, the output of which drives shaft 499 in accordance with the time of flight ($T_0$).

Fig. 6 shows a still further modification of the time of flight mechanism, which is an intermediate form in that it uses four of the five variables in Fig. 5. The mechanism shown in Fig. 6 is substantially the same as that in Fig. 5 except an average value of gun elevation is used. In this case gun azimuth ($A_g$) is introduced by shaft 501, which rotates a three-dimensional cam 502, and the indicated air speed is introduced by shaft 503 which translates the cam 502 whereby a follower 504 riding on the surface of the cam is positioned in accordance with the product of indicated air speed and a logarithmic function of gun azimuth ($A_g$).

The follower 504 acts through rack 505 and pinion 506 to drive shaft 507, representing one input of differential 508. The other input of the differential 508 is driven by shaft 509 that is positioned in accordance with double logarithmic function of altitude in the same manner as the shaft 478 shown in Fig. 5. Thus, shaft 459, which is rotated in accordance with a logarithmic function of the altitude (H), drives logarithmic cam 458, whereby rack follower 457 has a lift corresponding to the double logarithmic function of the altitude (H) and drives through pinion 456 to rotate the shaft 509 in accordance with said double logarithmic function.

The inputs represented by shafts 507 and 509 are combined by the differential 508 to rotate output shaft 511, which drives through pinion 512 to position an anti-logarithmic cam disc 513 having a cam groove 514 which positions a sector rack 515. A pinion 516 meshes with the sector rack 515 and rotates shaft 517 in accordance with the product of a logarithmic function of altitude (H) and a function of gun azimuth ($A_g$) raised to a power of indicated air speed (IAS).

The range ($D_0$) is introduced into the mechanism by shaft 519, which drives one input of differential 521 in accordance with the time of flight in a vacuum ($T_v$) which is a linear function of range ($D_0$). Shaft 519 also rotates logarithmic cam 522 having a follower 523 riding on its surface and positioned in accordance with a logarithmic function of range. The follower 523 drives through rack 524 and pinion 525 to rotate a shaft 526. Shafts 517 and 526 represent an input of differential 527, the output of which drives a shaft 528 in accordance with the sum of the logarithmic function of range ($D_0$) and the logarithmic function of altitude (H) multiplied by a function of gun azimuth ($A_g$) raised to a power corresponding to a function of indicated air speed. The shaft 528 drives through pinion 529 to position an anti-logarithmic cam disc 531 and cam groove 532, which positions a sector rack 533. The rack 533 drives a pinion 534 which rotates shaft 535 that is in turn positioned in accordance with the product of function of range (D₀) and a function of altitude (H), which latter function is raised to a power corresponding to a function of gun azimuth (Ag) that is in turn raised to a power corresponding to a function of indicated air speed (IAS). The shaft 535 is therefore positioned in accordance with the change in time of flight ($\Delta T_0$) which is combined with the time of flight in a vacuum ($T_v$) represented by shaft 535 in differential 521 to position output shaft 536 in accordance with the time of flight ($T_0$).

The functions of indicated air speed for the two mechanisms shown in Figs. 5 and 6 may also be obtained from the computer as will subsequently appear in connection with the ballistics unit. The gun elevation function may be supplied from the gyro unit by shaft 127, which has already been described as being positioned in accordance with the observed elevation angle. The difference between the observed elevation and the gun elevation is so small as to be immaterial for purposes of this computer.

*Prediction unit*

A prediction unit 229 includes four potentiometers, 227, 228, 233, and 234 (Fig. 4a), having sliders 541, 542, 543, and 544 respectively. The sliders 541, 542, 543, and 544 are driven by shafts 545, 546, 547, and 548, that are positioned through suitable gearing 551 in accordance with the time of flight as determined by shaft 455. It is understood that the shaft 455 may be driven by the output shaft of any of the three time of flight mechanisms heretofore described.

As was stated in connection with the description of the gyro unit, the difference in the voltages of leads 225 and 226 relative to ground is proportional to the torque applied by the azimuth torque motor 56, and hence is proportional to the angular rate of movement of the spin axis 68 of the gyro rotor 67, which corresponds to the angular rate of movement of the target in a lateral plane ($\Sigma A_s$). These voltages are applied to the potentiometers 227 and 228, respectively. Since the sliders 541 and 542 are positioned in accordance with the time of flight ($T_0$), the difference of the voltages of sliders 541 and 542 as represented by leads 553 and 554 is proportional to the lateral prediction angle ($\Delta A_s$).

Similarly, the voltage difference of leads 231 and 232 is proportional to the torque applied by the elevation torque motor 78 and hence is proportional to the angular rate ($\Sigma E_s$) of movement of the target in a vertical plane including the line of sight. Sliders 543 and 544 are rotated in accordance with a time of flight ($T_0$) so the output voltage difference as represented by leads 555 and 556 is proportional to the slant elevation prediction angle ($\Delta E_s$). The voltage of leads 553 and 554 and leads 555 and 556, representing the lateral and slant elevation prediction angles respectively, are supplied to a conversion unit 560 (Fig. 3) where they are converted to azimuth and elevation prediction angles.

*Conversion unit*

From an inspection of Fig. 2, it will be apparent that the lateral prediction angle ($\Delta A_s$), which is obtained by multiplying the angular rate ($\Sigma A_s$) in a lateral plane by the present time of flight ($T_0$), is quite different to the azimuth prediction angle ($\Delta A_h$), which must be added to the observed angle (A₀) in order to obtain future azimuth angle ($A_p$). Similarly, the slant elevation prediction angle ($\Delta E_s$), which is obtained by multiplying the angular rate ($\Sigma E_s$) of the target by the present time of flight ($T_0$) is quite different to the elevation prediction angle ($\Delta E_h$), which must be added to the observed elevation angle (E₀) to obtain the future elevation angle ($E_p$) of the predicted position of the target.

By trigonometric construction it may be shown that the elevation prediction angle ($\Delta E_h$) has a definite relation to the slant elevation prediction angle ($\Delta E_s$) and that this relation is dependent upon the elevation angle as well as the prediction angles. A similar arrangement is disclosed in Patent No. 2,423,821 to Garbarini et al., issued July 15, 1947.

The value of the azimuth prediction angle ($\Delta A_h$) may be expressed as follows:

(6) $$\Delta A_h = \tan^{-1}\left[\frac{\tan \Delta A_s}{\cos (E_0 + \Delta E)}\right]$$

wherein $\Delta E$ is the vertical prediction angle in a vertical plane including the line of sight. It can also be shown that the future elevation angle ($E_p$), that is, the sum of the observed elevation angle (E₀) and the elevation prediction angle ($\Delta E_h$) is represented by the following equation:

(7) $$E_p = \sin^{-1}[\sin (E_0 + \Delta E) \cos \Delta A_s]$$

It will be noted that both of these equations utilize the value of the vertical prediction angle ($\Delta E$) in their solution of the azimuth prediction angle ($\Delta A_h$) and the future elevation angle ($A_p$).

The value of the vertical prediction angle ($\Delta E$) may be expressed in terms of the following equation:

(8) $$\sin \Delta E = \frac{\sin \Delta E_s}{\cos \Delta A_s}$$

For the small size of the slant elevation prediction angle ($\Delta E_s$) and the vertical prediction angle ($\Delta E$) it can be assumed that the angles are equal to their sines and that (9) $$\Delta E \cong \frac{\Delta E_s}{\cos \Delta A_s}$$

which may be further approximated as

(10) $$\Delta E \cong \frac{\Delta E_s}{1 - \frac{(\Delta A_s)^2}{2}}$$

Since the value of the slant elevation prediction angle ($\Delta E_s$) is obtained in terms of the difference of two voltages, that is, voltage ($\Delta E_{s1}$) represented by lead 555 (Fig. 4b) ($\Delta E_{s2}$) represented by lead 556, it is possible to solve Equation 5 electrically in order to obtain the value of the vertical prediction angle ($\Delta E$).

The voltage ($\Delta E_{s1}$) on lead 555 is connected to both ends of a potentiometer 561, and the voltage ($\Delta E_{s2}$) represented by lead 556 is connected to both terminals of potentiometer 562. The sliders 563 and 564 of the potentiometers 561 and 562, respectively, are rotated in accordance with the lateral prediction angle ($\Delta A_s$) by motor 565, which rotates shaft 566 to drive shafts 567 and 568 through suitable gearing 569 and 571.

The lateral prediction angle motor 565 is operated in the following manner to rotate shaft 566 in accordance with the lateral prediction angle ($\Delta A_s$). The lateral prediction angle ($\Delta A_s$) is represented by the difference in the voltages appearing on leads 553 and 554. Lead 554 is connected through resistor 575 to grid 572 of tube 573, which is arranged in a balanced amplifier circuit with a similar tube 574. Lead 553 is applied to grid 576 of the tube 574 through a resistor 577 in a similar manner. The plates of tubes 573 and 574 are connected through opposite halves of winding 578 of the lateral prediction angle motor 565 to a suitable source of positive potential, such as battery 579. The cathodes of the two tubes are connected through a common cathode resistor 581 to a negative voltage 582, which provides a definite normal current through the two tubes and the opposite halves of the winding 578.

The shaft 566, which is rotated by the lateral prediction angle motor 565, drives through gearing 584 to rotate shaft 585 and slider 586 of potentiometer 587, that has its terminals connected to a battery 588, the midpoint of which is grounded. The slider 586 is connected through a resistor 587 to the grid 572.

If the voltages applied to the grids 572 and 576 are unequal, unequal currents flow through the two halves of the winding 578, causing the lateral prediction angle motor 565 to rotate in a direction that will move the slider 586 until the voltage on the grid 572 is made equal to that on the grid 576 by combining a positive or negative voltage with the voltage appearing on lead 553. It will be apparent, therefore, that the shaft 566 is rotated in accordance with the lateral prediction angle ($\Delta A_s$).

The voltages of sliders 563 and 564 are applied through resistors 591 and 592, which are equal and referred to as $R_2$, to grids 593 and 594 of tubes 595 and 596, which are arranged in a balanced amplifying circuit with their cathodes 597 and 598 connected through a resistor 599 to a source of negative potential such as battery 601, thus normally providing a definite current through each of the tubes.

Plates 602 and 603 of the tubes 595 and 596 are connected through opposite halves of winding 604 of the vertical prediction angle ($\Delta E$) motor 605 to a source of positive potential, such as battery 606.

The vertical prediction angle motor 605 drives through gearing 607 to rotate a shaft 608, which positions slider 609 of potentiometer 611, which has its terminals connected to a battery 612, the midpoint of which is grounded. The voltage in the slider 607 will hereinafter be referred to as the vertical prediction angle voltage ($\Delta E$).

The circuit of tubes 595 and 596 in motor 605 is so arranged that the motor drives the potentiometer slider 609 until its voltage when added to or subtracted from the voltage from the potentiometer slider 563 equals the voltage from the potentiometer slider 564. The vertical prediction angle voltage as determined by slider 609 is connected through a resistor 615 to grid 594. The resistor 615 has a value hereinafter referred to as $R_1$, which is equal to resistor 616, connected between the grid 593 of the tube 595 and ground.

When the motor 605 is in equilibrium and the voltage of grid 594 equals the voltage of grid 593, the voltages in the circuit may be represented by the following equation:

(11) $$\Delta E = \frac{\Delta E_{s2} - \Delta E_{s1}}{\frac{R_2 + R_3}{R_1}}$$

in which $\Delta E$ represents the voltage of slider 609, $\Delta E_{s2}$ represents the voltage of lead 556 from the prediction unit, the voltage $\Delta E_{s1}$ is equal to the voltage of lead 555 from the prediction unit, resistance $R_1$ is equal to the values of resistors 615 and 616, resistance $R_3$ is equal to the effective resistance of potentiometers 561 and 562 between lead 555 and slider 563 and between lead 556 and slider 564 (since sliders 563 and 564 are driven in unison the effective voltages of the potentiometers are equal), and the resistance $R_2$ is equal to the values of resistances 591 and 592.

Since the difference of the voltages $\Delta E_{s2}$ and $\Delta E_{s1}$, that is, the difference of the voltages of leads 555 and 556, is equal to a voltage that is proportional to the slant elevation prediction angle ($\Delta E_s$), this equation may be written as follows:

(12) $$\Delta E = \frac{\Delta E_s}{\frac{R_2 + R_3}{R_1}}$$

As the actual resistance of potentiometers 561 and 562 between their terminals has a value of $R_p$, the effective resistance $R_3$ between the leads 555 and 556 and sliders 563 and 564 may be represented by the following equation:

$$R_3 = \frac{R_p}{4} - \frac{K_1^2 \theta^2}{R_p}$$

in which $K_1$ represents the unit of resistance of potentiometer windings and $\theta$ represents the angle by which the slider is moved from the center-point of potentiometer winding. By substituting this value of $R_3$, we have:

(13) $$\frac{R_2 + R_3}{R_1} = \frac{R_2 + \frac{R_p}{4} - \frac{K_1^2 \theta^2}{R_p}}{R_1}$$

which may be rewritten as:

(14) $$\frac{R_2 + R_3}{R_1} = \frac{(4R_2 + R_p)}{4R_1}\left[1 - \frac{8K_1^2}{R_p(4R_2 + R_p)} \frac{\theta^2}{2}\right]$$

Since the values of $R_1$, $R_2$, and $R_p$ are constant, constants $K_2$ and $K_3$ may be substituted in Equation 14, which then becomes:

(15) $$\frac{R_2 + R_3}{R_1} = K_2\left(1 - \frac{K_3^2 \theta^2}{2}\right)$$

The shaft 566 of the lateral prediction angle motor 565 is rotated in accordance with the lateral prediction angle ($\Delta A_s$) so the value $\Delta A_s$ may be substituted for the value of $\theta$ provided the constant $K_3$ is introduced by the gearing 569 and 571, in which case Equation 15 may be written as:

(16) $$\frac{R_2 + R_3}{R_1} = K_2\left(1 - \frac{\Delta^2 A_s}{2}\right)$$

Then by substituting in the Equation 12, we have:

(17) $$\Delta E = \frac{\Delta E_s}{\left(1 - \frac{\Delta^2 A_s}{2}\right)}$$

provided that the constant $K_2$ is introduced by the gearing 607 of the vertical prediction angle motor 605.

Since the solution of Equation 17 for the vertical prediction angle ($\Delta E$) is the same as the trigonometric expression of Equation 10, it will be apparent that the vertical prediction angle motor 605 rotates in accordance with the vertical prediction angle ($\Delta E$) when the circuit is balanced, that is, when the voltage of grid 593 equals the voltage of grid 594.

The output of the vertical prediction angle motor 605 is geared through suitable gearing 621 to a shaft 622, which represents one input of a differential 623.

Shaft 127 of the gyro unit (Fig. 4a) is rotated in accordance with the observed elevation angle of the target, and this shaft is connected through gearing 625, shaft 626, and gearing 627 to shaft 127', which is also rotated in accordance with the observed elevation angle ($E_o$). The shaft 127 drives through gearing 629 to rotate shaft 631, forming a second input of the differential 623. Thus, an output shaft 632 of the differential 623 is rotated in accordance with the sum ($E_o+\Delta E$) of the observed elevation angle ($E_o$) and the vertical prediction angle ($\Delta E$). This output shaft drives through gearing 633 to rotate a shaft 634 carrying an elongated pinion 635 which meshes with a gear 636 on three-dimensional cam 637 to rotate the cam 637 together with a three-dimensional cam 638 in accordance with the sum ($E_o+\Delta E$) of observed elevation angle and vertical prediction angle. The shaft 566, which is rotated in accordance with the lateral prediction angle ($\Delta A_s$) drives through gearing 641, shaft 642, pinion 643, and rack 644 to translate the three-dimensional cams 638 and 637 in accordance with the lateral prediction angle ($\Delta A_s$).

Since the three-dimensional cam 637 is translated in accordance with the lateral prediction angle ($\Delta A_s$) and is rotated in accordance with the sum ($E_o+\Delta E$) of the observed elevation angle and the vertical prediction angle, its surface may be so arranged that follower 646 riding thereon has a lift corresponding to the azimuth prediction angle ($\Delta A_h$) as determined by Equation 6.

Similarly, since cam 638 is rotated in accordance with the sum ($E_o+\Delta E$) of the observed elevation angle and the vertical prediction angle and is translated in accordance with the lateral prediction angle ($\Delta A_s$), its surface may be so laid out that follower 647 has a lift corresponding to the future elevation angle ($E_p$) as determined by Equation 7.

From the foregoing description it will be apparent that the slant elevation prediction angle ($\Delta E_s$) and the lateral prediction angle ($\Delta A_s$) have been converted into elevation and azimuth prediction angles by first electrically converting the slant elevation prediction angle ($\Delta E_s$) into the vertical prediction angle ($\Delta E$), and then by combining the vertical prediction angle ($\Delta E$) with the lateral prediction angle ($\Delta A_s$) and the observed elevation angle ($E_o$) to obtain a future elevation angle ($E_p$) and azimuth prediction angle ($\Delta A_h$). The azimuth prediction angle may then be added to the observed azimuth angle ($A_o$) to determine the future azimuth angle ($A_p$).

The follower 646 has a rack 650 which engages a pinion 648 to rotate shaft 649, which forms one input of differential 651, in accordance with the azimuth prediction angle ($\Delta A_h$). The other input of the differential 651 is rotated in accordance with the observed azimuth angle ($A_o$) by shaft 112' so the output of the differential 651 as represented by shaft 652 is rotated in accordance with the sum ($A_o+\Delta A_h$) of the observed azimuth and azimuth prediction angles, that is, the future azimuth angle ($A_p$). Follower 647 translates a rack 654 which meshes with pinion 655 to rotate shaft 656 in accordance with the future elevation angle ($E_p$).

The conversion mechanism described has taken the lateral prediction angle and the slant elevation prediction angle in terms of electrical voltages and converted them into future azimuth and future elevation angles in terms of shaft displacement. If the lateral prediction and the slant elevation prediction angles are available in terms of shaft displacements, the conversion unit may be modified to convert these shaft displacements into future azimuth and future elevation angles, also in terms of shaft displacements.

One modified form of a conversion unit for mechanically computing the vertical prediction angle ($\Delta E$) and determining the azimuth prediction angle ($\Delta A_h$) and the future elevation angle ($E_p$) is shown in Fig. 7. If a lateral prediction angle ($\Delta A_s$) and the slant elevation prediction angle ($\Delta E_s$) are available in the form of shaft displacements, they may be driven into the modified conversion unit by shafts 661 and 662, respectively. The shaft 661 drives through suitable gearing 663 to rotate shaft 664 which drives through pinion 665 to translate a rack 666 carrying three-dimensional cams 667 and 668. The shaft 664 also drives through a second pinion 669 to translating rack 671 carrying a three-dimensional cam 672.

An elongated pinion 673 on the shaft 662 meshes with a gear 674 to rotate the cam 672 in accordance with the slant elevation prediction angle ($\Delta E_s$).

It may be shown trigonometrically that the vertical prediction angle ($\Delta E$) has the following definite relation with the lateral prediction angle ($\Delta A_s$) and the slant elevation prediction angle ($\Delta E_s$)

(18) $\Delta E = \sin^{-1}(\sin \Delta E_s \sec \Delta A_s)$

Since the cam 672 is translated according to the lateral prediction angle ($\Delta A_s$) and rotated in accordance with slant elevation prediction angle ($\Delta E_s$), it may be so designed that a follower 675 riding on the surface thereof has a lift corresponding to the vertical prediction angle ($\Delta E$) in accordance with Equation 18. A rack 676 on the follower 675 meshes with a pinion 677 to drive a shaft 678 in accordance with the vertical prediction angle ($\Delta E$). The shaft 678 forms one input of a differential 679, the other input of which is driven by a shaft 681 in accordance with the observed elevation angle ($E_o$), which may be driven by the shaft 127 from the elevation servomotor of the gyro shown in Fig. 4A.

The differential 679 has an output shaft 682 which is thus rotated in accordance with the sum ($E_o+\Delta E$) of the observed elevation angle and the vertical prediction angle. Shaft 682 drives through suitable gearing 683 to rotate a shaft 684 and an elongated pinion 685 which meshes with a gear 686 to rotate the cams 667 and 668 in accordance with the sum ($E_o+\Delta E$).

Since the cam 667 is translated in accordance with the lateral prediction angle ($\Delta A_s$) and rotated in accordance with the sum ($E_o+\Delta E$), a follower 688 riding on the surface thereof is displaced in accordance with the azimuth prediction angle ($\Delta A_h$) as determined by Equation 6. A rack 689 on the follower 678 drives through a pinion 691 to rotate a shaft 692 from one input of the differential 693 in accordance with the azimuth prediction angle ($\Delta A_h$). The other input of the differential 693 is driven by shaft 694 in accordance with the observed azimuth angle as determined by the gyro unit. Thus, output shaft 695 of the differential 693 is rotated in accordance with the sum ($A_o+\Delta A_h$) which is equal to the future azimuth angle ($A_p$).

The cam 668 is also rotated in accordance with the sum ($E_o+\Delta E$) and translated in accordance with the lateral prediction angle ($\Delta A_s$). The surface of the cam 668 may be so laid out that a follower 696 riding on its surface has a lift corresponding to the future elevation angle ($E_p$), in accordance with Equation 7. However, in order to provide a better scale factor, the surface of the cam 668, since it is rotated in accordance with the sum $(E_0+\Delta E)$, has this sum subtracted from its surface whereby the follower 696 is actually displaced in accordance with the expression $$E_p-(E_0+\Delta E)$$

The follower 696 has a rack 697 which drives a pinion 698 to rotate a shaft 699 forming one input of a differential 701, in accordance with the above expression. A shaft 702 forming a second input of the differential 701 is driven by shaft 682 through suitable gearing 703 in accordance with the sum $(E_0+\Delta E)$. Thus, output shaft 704 of the differential 701 is driven in accordance with the future elevation angle ($E_p$).

It will be apparent that the mechanism described utilizes the lateral prediction angle ($\Delta A_s$), the slant elevation prediction angle ($\Delta E_s$), and the observed azimuth and elevation angles ($A_0$) and ($E_0$) to determine future azimuth and elevation angles ($A_p$) and ($E_p$) by which shafts 695 and 704 are rotated. The shafts 695 and 704 correspond to the shafts 652 and 656 of the conversion unit described in connection with Fig. 4B.

Either of the foregoing conversion units may be used to determine the future azimuth and elevation angles.

*Ballistic correction unit*

The computer mechanism thus far described has taken data obtained by tracking the target in range, azimuth and elevation, and used this data to compute the future position of the target in terms of future azimuth and elevation angles. It is now only necessary to correct these future azimuth and elevation angles for ballistic effect on the projectile after it leaves the gun in order to determine the azimuth and elevation angle at which the guns must be positioned to hit the target.

A ballistic unit 711 (Fig. 3) considers two major factors in determining ballistic correction angles. These factors are the effects of windage and of gravity. The effect of windage jump has been omitted from the ballistics unit 711 because it was found that this effect is small and may be omitted without seriously affecting the operation of the computer.

The main windage effect is considered to be the wind force acting on the projectile during its flight to the target and thus deflecting the projectile from its original path. The total deflection due to this force is dependent upon the future range of the target, the velocity of the wind acting upon the projectile, the density of the air, and the angle of the projectile's path relative to the direction of the wind. The future range of the target, that is, the distance which a projectile must travel, may be computed from the values of range and range rate which are determined by the range computer 251.

The velocity of the wind acting upon the projectile may be computed as a function of the indicated air speed of the craft. This function of indicated air speed is introduced into the computer by a mechanism which will hereinafter be described. The density of air is a function of altitude and is introduced into the ballistics unit by the same mechanism that supplied a function of altitude to the time of flight unit 385.

Functions of future range, indicated air speed, and altitude, may be combined to determine the approximate windage force acting on a projectile. It is then only necessary to determine the effect of these forces upon the projectile, which is a function of the gun position angles. In order to correct the future azimuth and elevation angles which have been computed, it is necessary to determine lateral and vertical components of the ballistic correction angle. The force acting on the projectile may be resolved into vertical and lateral components. Each of these components depends upon the same variables of future range, indicated air speed, and altitude, and their resolution depends upon gun azimuth and gun elevation angles.

In the ballistics unit 711, as shown in detail in Fig. 4b, an approximate value of future range is determined as a function of range ($D_0$) and range rate ($\dot{D}_0$). As was discussed in connection with the time of flight unit 385, the ratio of future range ($D_p$) to present range ($D_0$) is approximately constant for a given range rate ($\dot{D}_0$). Hence, the future range may be expressed as the product of the present range ($D_0$) and a function of range rate ($\dot{D}_0$).

The windage force acting on the projectile may be expressed as the product of a function of future range, a function of indicated air speed, and a function of altitude. In order to determine the lateral ballistic deflection, it is only necessary to combine the force with a predetermined function of the gun azimuth angle ($A_g$) and the gun elevation angle ($E_g$), whereas the vertical windage deflection angle ($\delta E$) may be expressed as the product of a function of the future range, a function of indicated air speed, and a function of altitude, combined with different functions of the gun azimuth angle ($A_g$) and gun elevation angle ($E_g$). The vertical deflection angle thus computed does not consider the effect of gravity, which must be subsequently combined with the vertical deflection angle ($\delta E$) to obtain the superelevation angle ($\phi_s$).

From the foregoing description it follows that the windage force acting on the projectile may be expressed as the product of functions of range ($D_0$), range rate ($\dot{D}_0$), indicated air speed (IAS), and altitude (H). This force may be obtained most easily by adding the logarithms of the four functions involved.

Referring to Fig. 3, the mechanism for introducing indicated air speed will now be described. A hand wheel 715, which may be located in the pilot's or navigator's compartment, is adjusted to set in a logarithmic function of indicated air speed by rotating shaft 716, which positions rotor winding 717 of a self-synchronous transmitter 718. Obviously, the shaft 716 could be set automatically by a suitable air speed measuring device. The winding 717 is supplied from a suitable source, such as that shown at 719. The transmitter 718 has a stator winding 720 connected to secondary winding 721 of a self-synchronous receiver 722, whereby a voltage is induced in rotor winding 723 of the receiver 722, having a phase relation with the voltage of source 719 corresponding to the angular displacement between shaft 716 and a shaft 724, which positions the rotor 723.

A servomotor 725 drives through worm gear 726 and worm wheel 727 to rotate shaft 728, which in turn drives through gearing 729 to position shaft 731 in accordance with the desired logarithmic function of indicated air speed. The operation in control of servomotor 725 is substantially the same as that described in connection with the control of the altitude motor 414. The voltage of winding 723 is compared in phase with the voltage of a source 732, which is synchronized with the source 719, as by a phase detecting circuit including tubes 733 and 734. The output voltage across resistors 735 and 736 is supplied through condenser and resistance differentiating networks 737 and 738, and applied to the grids of amplifying tubes 739 and 741, having their plate circuits connected to opposite halves of winding 742 of the motor 725, whereby the motor rotates the winding 723 of receiver 722 until the phase of the voltage across the winding 723 corresponds to that of the source 732.

The shaft 731 supplied the logarithmic function of indicated air speed to the ballistic unit 711 and drives through gearing 745 to rotate shaft 746, forming one input of a differential 747 in accordance with the logarithmic function of indicated air speed. The shaft 424, which has already been described, is rotated in accordance with the logarithmic function of altitude, and drives one input of differential 748 of the ballistic unit 711. The other input of the differential 748, as represented by shaft 749, is driven through gearing 751, shaft 752, and gearing 753 by the shaft 296, which is rotated in accordance with logarithmic function of range $(D_0)$ as was described in connection with the range computer unit 251. The output of differential 748 rotates shaft 755 which drives a second input of the differential 747. The output of the differential 747, which is represented by shaft 756, drives one input of differential 757. The shaft 381, which has also been described in connection with the range computing unit, is positioned in accordance with a function of range rate, and drives through gearing 758 to rotate shaft 759, forming a second input of the differential 757.

It will be apparent that the differentials 748 and 747 add logarithmic functions of altitude (H), range $(D_0)$, and indicated air speed (IAS), whereby the output shaft 756 of differential 747 is rotated in accordance with the sum of these logarithmic functions. This sum of logarithmic functions is combined with the function of range rate in differential 757. The logarithmic function of range rate within the limits used in this computer is substantially linear. Hence, it is unnecessary to obtain the logarithmic function of range rate to be added to the other logarithmic functions, as the same result is accomplished by adding a more or less linear function of range rate. However, if the limits of the computer are increased to the point where a logarithmic function of range rate is necessary, it may easily be obtained by substituting a logarithmically wound potentiometer for the linear potentiometer 372 in the range rate motor control circuit of the range computer unit 251. If a logarithmic potentiometer is used, the range rate motor 362 is rotated in accordance with a logarithmic function of range rate.

An output shaft 761 of the differential 757 drives through gearing 762 to rotate shaft 763 in accordance with the sum of the four functions combined by the differentials 748, 747, and 757. An elongated pinion 764 meshes with a gear 765 on a cylindrical cam 766 having an antilogarithmic cam groove 767 formed in its surface, and engaged with a stationary cam pin 768. Since the gear 765 rotates the cylinder 766 in accordance with the sum of the four logarithmic functions represented by the output shaft 761, the cylinder 766 is translated in accordance with the product of these four functions by the action of the cam groove and pin.

The cylinder 766 is connected with cams 771 and 772 to also translate them in accordance with the product of these functions. The cams 771 and 772 are rotated by an elongated pinion 773, which meshes with a gear 774 and is driven by shaft 775 through suitable gearing 776 and shaft 777 in accordance with the gun azimuth angle $(A_g)$ in a manner to be subsequently described. A follower 778 riding on the surface of cam 772 translates cam 779 in accordance with a function of gun azimuth $(A_g)$, which is the desired function for determining the lateral ballistic correction angle. The cam 779 is rotated by an elongated pinion 781, meshing with a gear 782, by a shaft 783 corresponding to the gun elevation angle $(E_g)$ in a manner which will subsequently be described. A follower 784 riding on the surface of the cam 779 has a lift corresponding to the lateral windage deflection correction angle and acts through rack 785 and pinion 786 to rotate shaft 787 in accordance with the lateral windage deflection angle, which is equal to the lateral ballistic correction angle $(\delta A)$.

Similarly, a follower 789 riding on the surface of the cam 771 is positioned in accordance with the product of a predetermined function of the gun azimuth angle $(A_g)$ and the functions representing the force acting on the projectile. The follower 789 translates a cam 791, which is also rotated in accordance with the gun elevation angle $(E_g)$ by an elongated pinion 781, which meshes with a gear 792, whereby a follower 793 riding on the surface of the cam 791 is displaced in accordance with the vertical windage deflection angle $(\delta E)$. A rack 794, formed on the follower 793, meshes with a pinion 795 to rotate a shaft 796 in accordance with the vertical windage deflection angle $(\delta E)$.

By combining the gravity correction angle with the vertical windage deflection angle, it is possible to obtain a vertical ballistic correction angle which, when combined with the future elevation angle, provides the gun elevation angle desired.

The force of gravity is effective only in the vertical plane; hence, only affects the vertical correction angle. The total gravity deflection depends upon the time of flight and the gun elevation angle. This may be expressed in terms of a constant which includes the gravitational force, the time of flight, and the gun elevation angle $(E_g)$. For this purpose, the present time of flight $(T_0)$ is sufficiently accurate and is supplied to the ballistic unit by a shaft 801 which is driven by the shaft 451 through gearing 802 and acts through pinion 803 and rack 804 to translate a three-dimensional cam in accordance with the time of flight $(T_0)$. A gear 806 on the three-dimensional cam 805 meshes with elongated pinion 807 on the shaft 783 to rotate the cam 805 in accordance with the gun elevation angle $(A_g)$. Thus, follower 809, riding on the surface of the cam 805, is displaced in accordance with the gravity deflection angle $(G)$ and acts through rack 811 and pinion 812 to rotate shaft 813, forming an input of the differential 814.

One input of the differential 814 is driven in accordance with the vertical windage deflection angle $(\delta E)$, whereby the output, as represented by shaft 815, is rotated in accordance with the total elevation ballistic correction angle or superelevation angle $(\phi_s)$. The shaft 815 drives through gearing 816 to position shaft 817, forming one input of a differential 818 in accordance with the superelevation angle $(\phi_s)$. The other input of differential 818 is driven by the shaft 656 in accordance with the future elevation angle ($E_p$) whereby the output as represented by shaft 819 is rotated in accordance with the gun elevation angle ($E_g$).

The shaft 819 positions a rotor winding 821 of a suitable self-synchronous transmitter 822 that is energized from a source 823. The transmitter 822 has a stator winding 824 that is connected with a stator winding 825 of a suitable receiver 826, having a rotor 827 that is positioned in accordance with position of shaft 828, which is driven through suitable gearing 829 by a gun elevation motor 831.

The gun elevation motor 831 is controlled to rotate shaft 828 until the position of rotor 827 corresponds to the position of rotor 821 as determined by comparing a source of reference voltage 832 with the voltage across the winding 827 as by suitable phase detecting tubes 833 and 834, which are connected through smoothing networks 835 and 836 to control amplifying tubes 837 and 838. The plate circuits of tubes 837 and 838 are connected through the opposite halves of winding 839 of the motor 831, whereby the motor drives in one direction or another depending upon the sense of the phase displacement of the voltage across winding 287 as compared with reference voltage 832.

The motor 831 drives shaft 828 until its position corresponds with the position of shaft 819. The motor 831 thereby positions shaft 783 in accordance with the gun elevation angle ($E_g$) and drives gun elevation into the ballistic correction mechanism to rotate cams 779, 791, and 805, as has already been described.

The shaft 787, which is rotated in accordance with the lateral ballistic correction angle ($\delta A$), drives through gearing 841, shaft 842, and gear 843 to rotate a shaft 845, forming one input of differential 846, in accordance with the lateral ballistic correction angle ($\delta A$). The other input of the differential 846 is driven by shaft 652 in accordance with the future azimuth angle ($A_p$) whereby output shaft 847 is positioned in accordance with the gun azimuth angle ($A_g$), which positions rotor winding 848 of a self-synchronized transmitter 849 that is energized by a suitable source 851. The transmitter 849 has a stator winding 852 connected to stator 853 of a self-synchronized receiver 854, which has a rotor 855 positioned by a shaft 856 that is driven through suitable gearing 857 by a gun azimuth angle motor 858.

The motor 858 is controlled by phase detecting tubes 859 and 862 in a manner similar to that described in the gun elevation angle motor 831. Tubes 859 and 862 are connected through smoothing networks 863 and 864 to control amplifying tubes 865 and 866 which are connected to opposite halves of winding 867 of the motor 858, whereby the motor rotates to position shaft 856 in accordance with the position of shaft 847 as determined by comparing the phase of voltage across rotor winding 855 of the receiver 854 with a reference voltage from a source 869.

The shaft 856 drives through suitable gearing 871 to rotate shaft 777 in accordance with the gun azimuth angle ($A_g$) and thus position cams 771 and 772.

Shafts 828 and 856, representing the gun elevation angle ($E_g$) and gun azimuth angle ($A_g$), may be used to position the guns in any suitable manner as by positioning self-synchronous transmitters 873 and 874 which are connected by cables 875 and 876 to suitable servo mechanisms (not shown).

Summary

The computer which constitutes the subject matter of this invention thus utilizes rates determined by the precession torques applied to a gyro in tracking a target, together with the observed azimuth and elevation angles of the target, the range of the target, and the altitude and indicated air speed of the aircraft, to determine the angles at which guns on the craft must be positioned in order to direct a projectile toward a predicted future position of the target.

In summary, referring again to Fig. 3, signals either from the hand control 29 or the radio sight 11 are supplied through switch 21 to the gyro unit 23, which controls suitable amplifiers for the application of torques by torque motors on the two axes of the gyro. Voltages proportional to the torque applied, representing lateral and vertical rates of movement of the target, are supplied to prediction unit 229.

The range computer 251 is controlled either by range foot pedal 241 to position stadia lines 163, or by the automatic radio range 341 of the radio sight 11 to determine a logarithmic function of range ($D_0$) as represented by shaft 296 and a function of range rate ($\dot{D}_0$) as represented by shaft 381.

The range computer also computes the time of flight in a vacuum, which is a linear function of the range ($D_0$) and is equal to the range divided by the muzzle velocity. This is supplied by shaft 829 to the time of flight unit 385. The time of flight unit 385 utilizes the logarithmic function of range ($D_0$) as supplied by shaft 296, the logarithmic function of altitude as supplied by shaft 424, which is controlled by hand wheel 388 in a remote compartment, and the observed azimuth angle ($A_o$) which is supplied by shaft 112' from the gyro unit 23 and shaft 428. The time of flight unit computes the product of functions of range ($D_0$), observed azimuth ($A_o$), and altitude (H) to determine the change in time of flight due to prevailing conditions. This change in time of flight is combined with the time of flight in a vacuum to provide a time of flight ($T_0$) to the present position of the target as represented by shaft 451 and supplied to the prediction unit 229 by shaft 455. Obviously, the modified mechanisms shown in Fig. 5 or Fig. 6 may be substituted for the time of flight unit 385.

The prediction unit 229 combines the lateral and vertical rates ($\Sigma A_s$ and $\Sigma E_s$) with the time of flight ($T_0$) to obtain a lateral prediction angle ($\Delta A_s$) and a slant elevation prediction angle ($\Delta E_s$).

Values of these angles are supplied in electrical form to the conversion unit 569, where are combined with the observed elevation angle ($E_o$) as represented by shaft 127' from the gyro unit 23 and introduced by shaft 631 into the conversion unit 569. The conversion unit determines the azimuth prediction angle ($\Delta A_h$) as represented by rotation of shaft 649, which is combined with the observed azimuth angle ($A_o$) in the differential 651 to determine the future azimuth angle ($A_p$). The other output of the conversion unit is the future elevation angle ($E_p$), which is represented by shaft 656.

The ballistics unit 711 is supplied with a logarithmic function of range ($D_0$) by shaft 749, which is driven through shaft 296; a function of range rate ($\dot{D}_0$) which is represented by shaft 759, that is driven by shaft 381; a function of altitude represented by the shaft 424; and a function of indicated air speed represented by shaft 731, that is controlled by hand wheel 715 in a remote compartment. These four functions are combined together with functions of the gun azimuth angle ($A_G$) and the gun elevation angle ($E_G$) to determine lateral and vertical windage deflection angles. The lateral windage deflection angle as represented by output shaft 787 is combined in differential 846 with the future azimuth angle ($A_P$) from shaft 652, to determine the gun azimuth angle as represented by shaft 847 and which controls suitable servo mechanism 867 to drive the gun azimuth position back onto the ballistics unit by shaft 877 and also to position transmitter 874 for supplying the gun azimuth angle to the guns.

A gravity deflection angle is determined by combining the time of flight, which is introduced by shaft 801, with the gun elevation angle of shaft 783 to determine the gravity deflection angle (G). The vertical windage deflection angle ($\delta E$) is combined with the gravity deflection angle (G) to determine the superelevation angle ($\phi_S$) which is represented by output shaft 817 and combined with the future elevation angle ($E_P$) in differential 818 to position transmitter 822 in accordance with the elevation gun aiming angle ($E_G$). The position of transmitter 822 controls a servo mechanism 831 which operates a position transmitter 873 for supplying the gun elevation angle ($E_G$) to the guns and also drives the gun elevation angle by means of shaft 783 back into the ballistics unit 711.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A lead angle computing mechanism for airborne ordnance comprising a gyro, a pair of torque motors, one for the vertical axis and one for the horizontal axis of the gyro for applying precessing torques thereto for the purpose of tracking a target with the spin axis of the gyro, an amplifier for each torque motor for providing operating currents therefor proportional to the required rate of precession, a shaft displaced in accordance with time of flight, a plurality of potentiometers actuated by the shaft and energized by the amplifiers in accordance with the operating currents of the torque motors, elevation and azimuth prediction servomotors controlled by the potentiometers respectively in accordance with elevation and azimuth prediction components of a lead angle, a pair of three dimensional cams joined in tandem displaced in translation by the azimuth prediction servo, a differential for rotating the cams having one input actuated by the elevation prediction servo and a second input actuated by the gyro in accordance with the angular position of the spin axis in elevation, lift pins for the respective cams, one cam being laid out to displace its lift pin according to the future elevation angle and the other cam being laid out to displace its lift pin according to the azimuth prediction angle in a horizontal plane.

2. A lead angle computing mechanism for airborne ordnance comprising a gyro, a pair of torque motors, one for the vertical axis and one for the horizontal axis of the gyro for applying precessing torques thereto for the purpose of tracking a target with the spin axis of the gyro, an amplifier for each torque motor for providing operating currents therefor proportional to the required rate of precession, a shaft displaced in accordance with time of flight, a pair of potentiometers for each amplifier actuated by the shaft and energized by the associated amplifier according to the operating current of the torque motor, elevation and azimuth prediction servomotors controlled by the respective pairs of potentiometers in accordance with elevation and azimuth prediction components of a lead angle computed in a slant plane, a pair of three dimensional cams joined in tandem displaced in translation by the azimuth prediction servo, a differential for rotating the cams having one input actuated by the elevation prediction servo and a second input actuated by the gyro in accordance with the angular position of the spin axis in elevation, lift pins for the respective cams, one cam being laid out to displace its lift pin according to the future elevation angle and the other cam being laid out to displace its lift pin according to the azimuth prediction angle in a horizontal plane.

RICHARD C. KNOWLES.
WALTER T. WHITE.
HERBERT HARRIS, Jr.
EDWARD J. NAGY.
EDMUND B. HAMMOND, Jr.

REFERENCES CITED

The following references are of record in the file of this patent:

UNITED STATES PATENTS

| Number | Name | Date |
|---|---|---|
| 735,497 | Griffith | Aug. 4, 1903 |
| 1,281,703 | Taylor et al. | Oct. 15, 1918 |
| 1,869,502 | Petschenig | Aug. 2, 1932 |
| 1,990,577 | Watson | Feb. 12, 1935 |
| 2,235,826 | Chafee | Mar. 25, 1941 |
| 2,340,865 | Chafee et al. | Feb. 8, 1944 |
| 2,414,108 | Knowles et al. | Jan. 14, 1947 |
| 2,423,831 | Garbarini et al. | July 15, 1947 |
| 2,433,843 | Hammond et al. | Jan. 6, 1948 |

Certificate of Correction

Patent No. 2,564,698            August 21, 1951

RICHARD C. KNOWLES ET AL.

It is hereby certified that error appears in the printed specification of the above numbered patent requiring correction as follows:

Column 12, line 23, for "$(D_o)$" read $(\dot{D}_o)$; column 13, line 60, for "vardy" read *vary*; column 14, lines 18 and 21, for "$(D_o)$" read $(\dot{D}_o)$; column 20, line 20, for that portion of the equation "$\Delta Ah$" should read $\Delta A_h$; column 22, line 35, for that portion of the equation "$[1=$" should read $[1-$; line 68, for "sutable" read *suitable*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*